US012634297B2

(12) United States Patent
Muthiah et al.

(10) Patent No.: US 12,634,297 B2
(45) Date of Patent: May 19, 2026

(54) SYSTEMS AND METHODS FOR AUTONOMOUS PROGRAM DETECTION

(71) Applicant: Citrix Systems, Inc., Fort Lauderdale, FL (US)

(72) Inventors: Manikam Muthiah, Bangalore (IN); Premkumar Sj, Bangalore (IN); Sourabh Dalodia, Bangalore (IN); Aneesh Pradeep, Bangalore (IN); Rajan Kumar, Bangalore (IN)

( * ) Notice: Subject to any disclaimer, the term of this patent is extended or adjusted under 35 U.S.C. 154(b) by 670 days.

(21) Appl. No.: 17/398,094

(22) Filed: Aug. 10, 2021

(65) Prior Publication Data

US 2022/0417266 A1     Dec. 29, 2022

(30) Foreign Application Priority Data

Jun. 24, 2021    (IN) .............................. 202141028335

(51) Int. Cl.
*H04L 9/40* (2022.01)
*H04L 29/06* (2006.01)

(52) U.S. Cl.
CPC ...... *H04L 63/1416* (2013.01); *H04L 63/1441* (2013.01)

(58) Field of Classification Search
CPC .................... H04L 63/1416; H04L 63/1441
See application file for complete search history.

(56) References Cited

U.S. PATENT DOCUMENTS

| | | | | |
|---|---|---|---|---|
| 8,621,065 B1 * | 12/2013 | Saurel | .................. | G06F 21/554 |
| | | | | 709/200 |
| 10,931,686 B1 * | 2/2021 | Mehta | ................. | H04L 63/1416 |
| 11,138,463 B1 * | 10/2021 | Wang | .................... | G06N 5/047 |
| 2014/0033310 A1 * | 1/2014 | Cheng | ................. | H04L 63/1416 |
| | | | | 726/23 |
| 2016/0191554 A1 * | 6/2016 | Kaminsky | .......... | H04L 63/1425 |
| | | | | 726/23 |
| 2019/0141061 A1 * | 5/2019 | Krishtal | ................ | H04L 63/101 |
| 2019/0166141 A1 * | 5/2019 | Xu | ....................... | H04L 63/1425 |
| 2019/0268359 A1 * | 8/2019 | Zhang | ................ | H04L 63/1416 |
| 2019/0334940 A1 * | 10/2019 | Bar Noy | ............ | G06F 16/2379 |
| 2020/0314127 A1 * | 10/2020 | Wilson | .................... | H04L 43/16 |
| 2020/0374297 A1 * | 11/2020 | Bilas | ..................... | H04L 67/146 |
| 2021/0092141 A1 * | 3/2021 | Gamble | ............. | H04L 63/1433 |
| 2022/0417222 A1 * | 12/2022 | Katta | ................. | H04L 63/1416 |

FOREIGN PATENT DOCUMENTS

DE         202010016871 U1 *    4/2011    ............. H04L 63/10

* cited by examiner

*Primary Examiner* — Darshan I Dhruv

(57)     ABSTRACT

Systems and methods for scraping detection include a device which receives a plurality of requests from a client to extract data from a resource. The device may classify activity of the client as activity of an autonomous program based at least on a number of the plurality of requests, and one of i) one or more content types of the requests, or ii) a frequency in which the requests are received. The device may block, responsive to classification of the activity, a subsequent request from the client to extract data from the resource.

18 Claims, 8 Drawing Sheets

400

500

SYSTEMS AND METHODS FOR AUTONOMOUS PROGRAM DETECTION

CROSS-REFERENCE TO RELATED APPLICATION

This application claims priority to and the benefit of Indian Provisional Patent Application No. 202141028335, titled "SYSTEMS AND METHODS FOR AUTONOMOUS PROGRAM DETECTION," and filed on Jun. 24, 2021, the contents of all of which are hereby incorporated herein by reference in its entirety for all purposes.

BACKGROUND

In a network environment, a plurality of client devices can be connected to one or more servers to access applications provided by the servers. As a level of traffic to a server increases, the quality of service the server can provide may decrease.

SUMMARY

Today, servers can often be overloaded or have insufficient resources to handle the traffic. This traffic can include attempts to access the application or server from malicious programs or actors. For example, a malicious program or actor (such as an autonomous program) may request, extract, or otherwise scrape content from the application or server. The autonomous program may scrape content for various purposes, such as website or webpage reproduction, price alerts, image reproduction, and so forth. Where a server or application receives requests from both legitimate and malicious actors, the server or application may be overloaded with requests. The overload condition can result in service disruptions or failures.

The present disclosure is directed towards systems and methods for autonomous program detection, such as detecting web scraping attacks or web scraping activities performed via autonomous programs. In particular, the systems and methods described herein may detect activity of autonomous programs (or other actors) which are attempting to accumulate, extract, collect, or otherwise scrape content and data from various web resources. Such content/data may be used for illegitimate purposes, such as site or resource duplication, obtaining or collecting process of certain items listed for sale (e.g., price scraping), buying inventory at lowest prices, collecting lists of product images from various sites or resources (e.g., image scraping), and so forth. Often times, such websites and resources are scraped in an autonomous manner (e.g., by an autonomous program executing on a client).

The systems and methods described herein may establish a classification scheme (or classification scheme) according to a client behavior pattern for detection and classification of client activity. The classification scheme may be trained based on attributes which include, for example, a number of requests within a given time duration (referred to herein as a "burst size"), a total number of requests, and a type of content requested. The classification scheme may be applied to session data to classify the activity of the client within the session as scraping (or autonomous program) activity. According to the embodiments described herein, the classification scheme may be configured to distinguish between legitimate users (i.e. users accessing a website or resources through a browser or mobile application executing on a client) and autonomous programs (e.g., autonomous programs executing on a client for scraping or otherwise collecting content/data from the website or resource). For example, users accessing content and sites via browsers have specified workflows and associated access (http req/resp). Autonomous programs, on the other hand, have a specific workflow (only access what is needed), which may stand out from typical users.

According to at least one embodiment, a device may receive a plurality of requests to extract or obtain data for a webpage (e.g., a website, or other resource) from a client. Such requests may be or include requests to obtain data of the webpage (such as a framework or hypertext markup language (HTML) for rendering the webpage, content which is referenced in the framework/HTML, and so forth). The device may classify activity of the client as activity on an autonomous program based on a number of the plurality of requests, one or more content types of the requests, and/or a frequency in which the requests are received. In some implementations, the device may classify the activity by applying the activity to the classification scheme. The device may block subsequent request(s) from the client to extract data from the webpage responsive to the classification of the activity.

According to the implementations and embodiments described herein, the device may be configured to detect or extract attributes from activity of a client in a session (e.g., with a server hosting the webpage) to characterize or classify activity of the client as autonomous program activity (or user activity). Such implementations provide protection across a wide variety of websites, resources or other webpages, while limiting the likelihood of legitimate user interruption, since user activity would be classified as legitimate and therefore permitted. Various other embodiments and advantages of the present systems and methods are described in greater detail below.

In one aspect, this disclosure is directed to a method. The method includes receiving, by a device from a client, a plurality of requests to extract data from a resource. The method includes classifying, by the device, activity of the client as activity of an autonomous program based at least on a number of the plurality of requests, and one of i) one or more content types of the requests, or ii) a frequency in which the requests are received. The method includes blocking, by the device, responsive to classification of the activity, a subsequent request from the client to extract data from the resource.

In some embodiments, the method further includes training a plurality of classification schemes for classifying the activity of the client as activity of an autonomous program. Training the plurality of classification schemes may include receiving a dataset comprising a plurality of entries, each entry of the plurality of entries including data for a plurality of requests. Training the plurality of classification schemes may include determining, for each entry of the dataset, a number of total requests for the entry, a count of content types requested in the requests, or a frequency of the requests. Training the plurality of classification schemes may include applying the number of total requests, the count of content types, and the frequency of requests to a clustering algorithm to generate a classification scheme for a request count, a content type, or a frequency of requests. In some embodiments, a first cluster generated by the clustering algorithm is assigned to activity of clients classified as activity of a user, and a second cluster generated by the clustering algorithm is assigned to activity of clients classified as activity of an autonomous program. In some embodiments, the classification scheme for the content type, or the frequency of requests is an entropy classification scheme.

In some embodiments, the device classifies the activity of the client as activity of an autonomous program responsive to one or more features extracted from the plurality of requests satisfying one or more classification schemes maintained by the device. In some embodiments, the method further includes applying, by the device, a volume filter to the plurality of requests. In some embodiments, the method further includes grouping, by the device, the plurality of requests into a session of a respective client of a plurality of clients. The activity of the plurality of clients may be classified according to requests from sessions of the plurality of clients.

In some embodiments, the method further includes extracting, by the device, one or more features from the plurality of requests. The one or more features may be used for classifying the activity of the client as activity of an autonomous program. In some embodiments, the one or more features comprise two or more of a number of requests in a session between the client and a server, a number of unique uniform resource locators (URLs) in the session, a number of different content types accessed by the client in the session, a number of requests for each different content type of the number of different content types, a content type entropy of the session, or a number of requests which request informational content. In some embodiments, the count comprises a first count, and the one or more features include a total of bursts within a session between the client and a server, wherein each burst comprises a number of requests from the client to the server within a respective time duration, a respective second count of the number of requests from each burst of the total number of bursts, and an entropy of the respective second count from each burst within the session.

In another aspect, this disclosure is directed to a device. The device includes one or more processors configured to receive, from a client, a plurality of requests to extract data from a resource. The one or more processors are configured to classify activity of the client as activity of an autonomous program based at least on a number of the plurality of requests, and one of i) one or more content types of the requests, or ii) a frequency in which the requests are received. The one or more processors are configured to block, responsive to classification of the activity, a subsequent request from the client to extract data from the resource.

In some embodiments, the one or more processors are further configured to train a plurality of classification schemes for classifying the activity of the client as activity of an autonomous program. Training the plurality of classification schemes may include receiving a dataset comprising a plurality of entries, each entry of the plurality of entries including data for a plurality of requests. Training the plurality of classification schemes may include determining, for each entry of the dataset, a number of total requests for the entry, a count of content types requested in the requests, or a frequency of the requests. Training the plurality of classification schemes may include applying the number of total requests, the count of content types, and the frequency of requests to a clustering algorithm to generate a classification scheme for a request count, a content type, or a frequency of requests. In some embodiments, a first cluster generated by the clustering algorithm is assigned to activity of clients classified as activity of a user, and a second cluster generated by the clustering algorithm is assigned to activity of clients classified as activity of an autonomous program. In some embodiments, the classification scheme for the content type, or the frequency of requests is an entropy classification scheme.

In some embodiments, the one or more processors are configured to classify the activity of the client as activity of an autonomous program responsive to one or more features extracted from the plurality of requests satisfying one or more classification schemes maintained by the device. In some embodiments, the one or more processors are further configured to group the plurality of requests into a session of a respective client of a plurality of clients. The activity of the plurality of clients may be classified according to requests from sessions of the plurality of clients.

In some embodiments, the one or more processors are further configured to extract one or more features from the plurality of requests. The one or more features may be used for classifying the activity of the client as activity of an autonomous program. In some embodiments, the one or more features include two or more of a number of requests in a session between the client and a server, a number of unique uniform resource locators (URLs) in the session, a number of different content types accessed by the client in the session, a number of requests for each different content type of the number of different content types, a content type entropy of the session, or a number of requests which request informational content. In some embodiments, the count includes a first count. The one or more features include a total of bursts within a session between the client and a server, wherein each burst comprises a number of requests from the client to the server within a respective time duration, a respective second count of the number of requests from each burst of the total number of bursts, and an entropy of the respective second count from each burst within the session.

In another aspect, this disclosure is directed to a non-transitory computer readable medium. The non-transitory computer readable medium stores program instructions for causing a device including one or more processors to receive, from a client, a plurality of requests to extract data from a resource. The non-transitory computer readable medium stores program instructions for causing a device including one or more processors to classify activity of the client as activity of an autonomous program based at least on a number of the plurality of requests, and one of i) one or more content types of the requests, or ii) a frequency in which the requests are received. The non-transitory computer readable medium stores program instructions for causing a device including one or more processors to block, responsive to classification of the activity, a subsequent request from the client to extract data from the resource.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

Figure 1A:
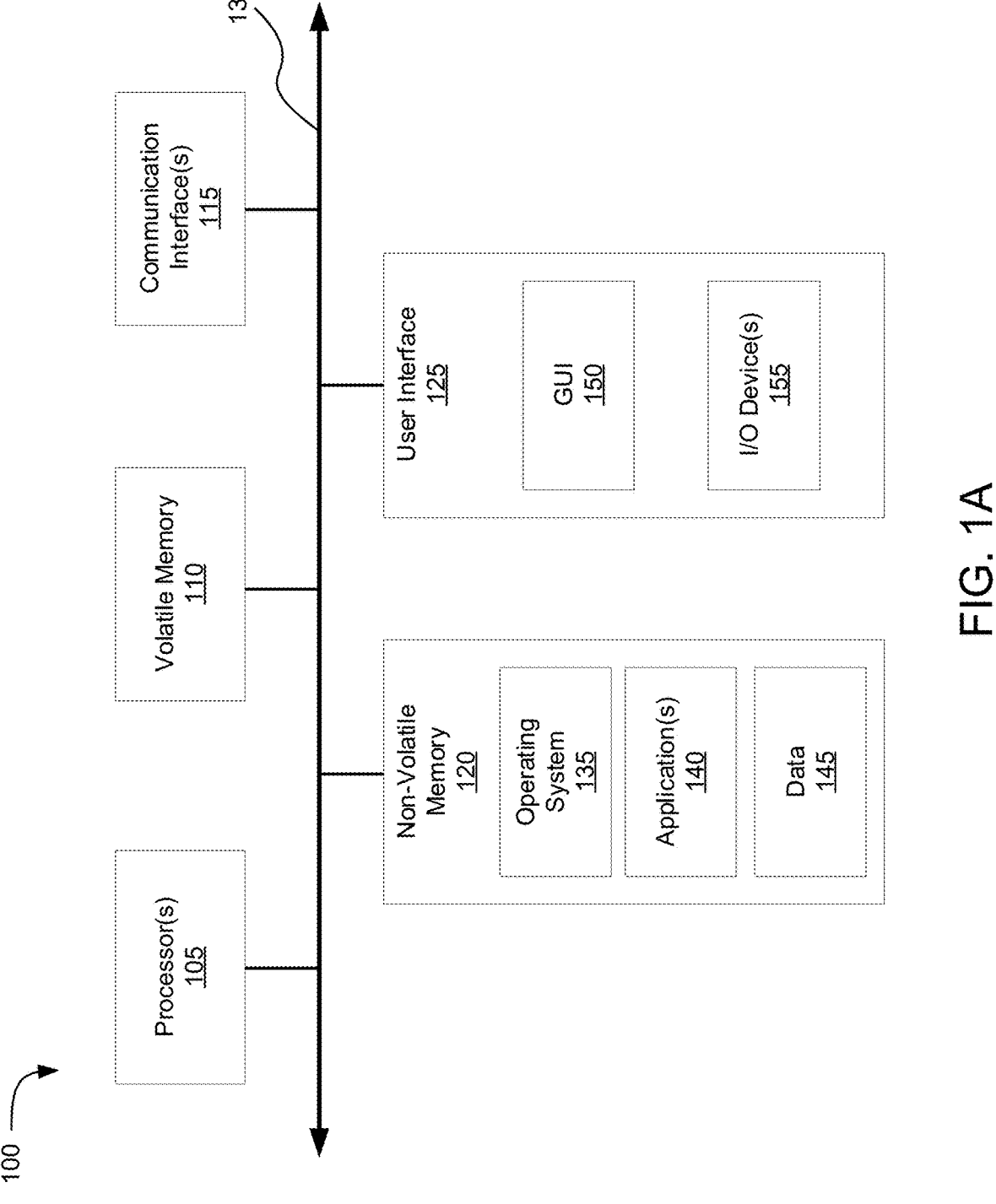
FIG. 1A is a block diagram of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein;

Section B describes embodiments of systems and methods for autonomous program detection; and Section C describes various example embodiments of the systems and methods described herein.

A. NETWORK AND COMPUTING ENVIRONMENT

As shown in FIG. 1A, computer 100 may include one or more processors 105, volatile memory 110 (e.g., random access memory (RAM)), non-volatile memory 120 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 115, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 120 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 115 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computer 100 may execute an application on behalf of a user of a client computing device. For example, the computer 100 may execute a virtual machine, which provides an execution session within which applications execute on behalf of a user or a client computing device, such as a hosted desktop session. The computer 100 may also execute a terminal services session to provide a hosted desktop environment. The computer 100 may provide access to a computing environment including one or more of: one or more applications, one or more desktop applications, and one or more desktop sessions in which one or more applications may execute.

Figure 1B:
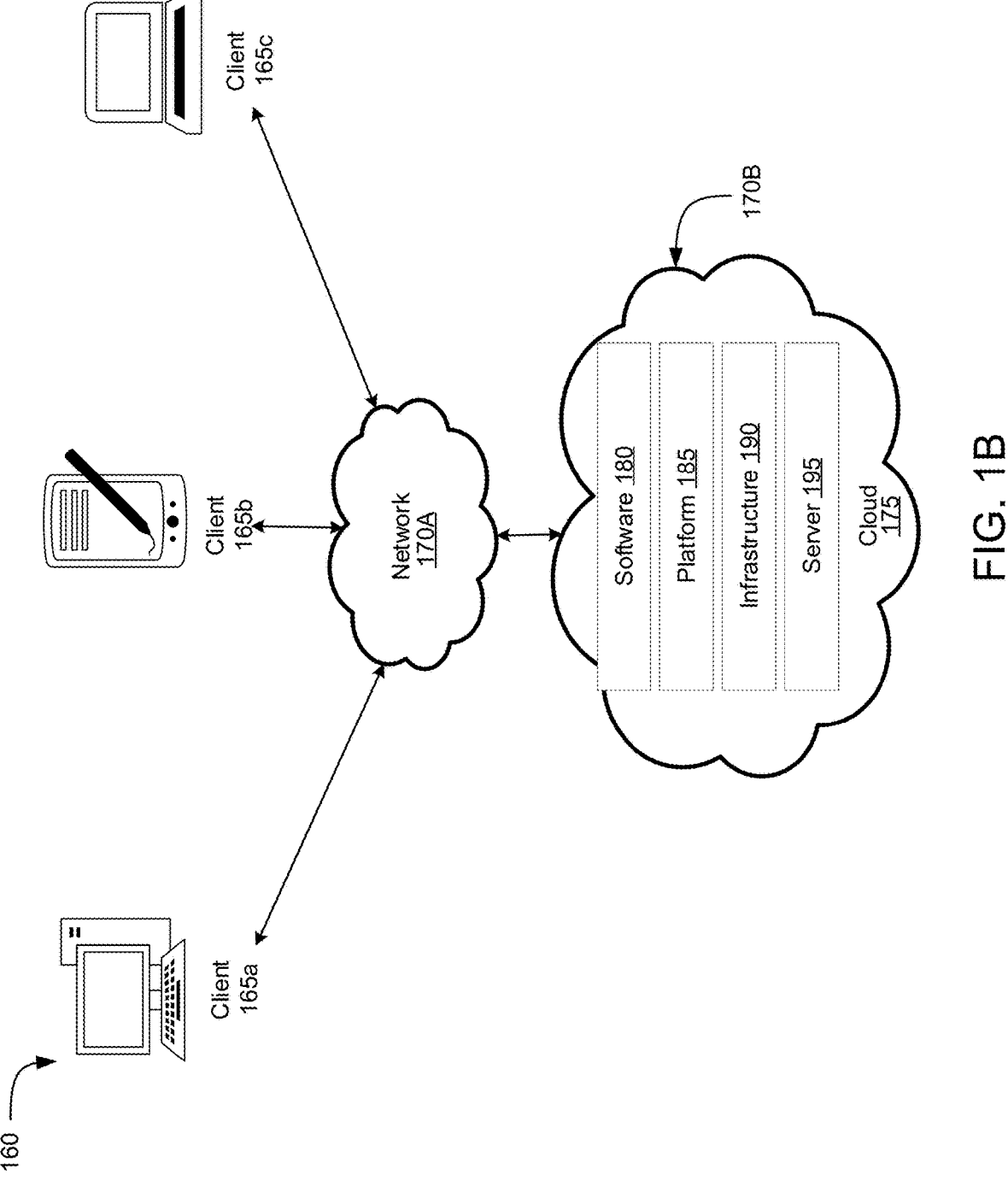
FIG. 1B is a block diagram depicting a computing environment including client device in communication with cloud service providers.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers 195, processing, memory, storage, applications, virtual machines, databases, software, hardware, analytics, and intelligence.

In embodiments, the computing environment 160 may provide client 165 with one or more resources provided by a network environment. The computing environment 160 may include one or more clients 165*a*-165*n*, in communication with a cloud 175 over one or more networks 170A, 170B. Clients 165 may include, e.g., thick clients, thin clients, and zero clients. The cloud 175 may include back end platforms, e.g., servers 195, storage, server farms or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 175 may include public servers 195 that are maintained by third parties to the clients 165 or the owners of the clients 165. The servers 195 may be located off-site in remote geographical locations as disclosed above or otherwise. Public clouds 175 may be connected to the servers 195 over a public network 170. Private clouds 175 may include private servers 195 that are physically maintained by clients 165 or owners of clients 165. Private clouds 175 may be connected to the servers 195 over a private network 170. Hybrid clouds 175 may include both the private and public networks 170A, 170B and servers 195.

The cloud 175 may include back end platforms, e.g., servers 195, storage, server farms or data centers. For example, the cloud 175 can include or correspond to a server 195 or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, California). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROP-BOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. SYSTEMS AND METHODS FOR AUTONOMOUS PROGRAM DETECTION

The present disclosure is directed towards systems and methods for autonomous program detection, such as detecting web scraping attacks or web scraping activities performed via autonomous programs. In particular, the systems and methods described herein may detect other activity (e.g, by other actors) which are attempting to accumulate, extract, collect, or otherwise scrape content and data from various web resources. Such content/data may be used for illegitimate purposes, such as site or resource duplication, obtaining or collecting process of certain items listed for sale (e.g., price scraping), buying inventory at lowest prices, collecting lists of product images from various sites or resources (e.g., image scraping), and so forth. Often times, such websites and resources are scraped or otherwise accessed in an autonomous manner (e.g., by an autonomous program executing on a client).

The systems and methods described herein may establish a classification scheme according to a client behavior pattern for detection and classification of client activity. The classification scheme (or model, profile, etc.) may be generated based on attributes which include, for example, a number of requests within a given time duration (referred to herein as a "burst size"), a total number of requests, and a type of content requested. The classification scheme may be applied to session data to classify the activity of the client within the session as scraping (or autonomous program) activity. According to the embodiments described herein, the classification scheme may be configured to distinguish between legitimate users (i.e. users accessing a website or resources through a browser or mobile application executing on a client) and autonomous programs (e.g., autonomous programs executing on a client for scraping or otherwise collecting content/data from the website or resource). For example, users accessing content and sites via browsers have specified workflows and associated access (http req/resp). Autonomous programs, on the other hand, have a specific workflow (only access what is needed), which may stand out from typical users.

According to at least one embodiment, a device may receive a plurality of requests to extract or obtain data for a webpage (e.g., a website, or other resource) from a client. Such requests may be or include requests to obtain data of the webpage (such as a framework or hypertext markup language (HTML) for rendering the webpage, content which is referenced in the framework/HTML, and so forth). The device may classify activity of the client as activity on an autonomous program based on a number of the plurality of requests, one or more content types of the requests, and/or a frequency in which the requests are received. In some implementations, the device may classify the activity by applying the activity to the classification scheme. The device may block subsequent request(s) from the client to extract data from the webpage responsive to the classification of the activity.

According to the implementations and embodiments described herein, the device may be configured to detect or extract attributes from activity of a client in a session (e.g., with a server hosting the webpage) to characterize or classify activity of the client as autonomous program activity (or user activity). Such implementations provide protection across a wide variety of websites, resources or other webpages, while limiting the likelihood of legitimate user interruption, since user activity would be classified as legitimate and therefore permitted. Various other embodiments and advantages of the present systems and methods are described in greater detail below.

Figure 2:
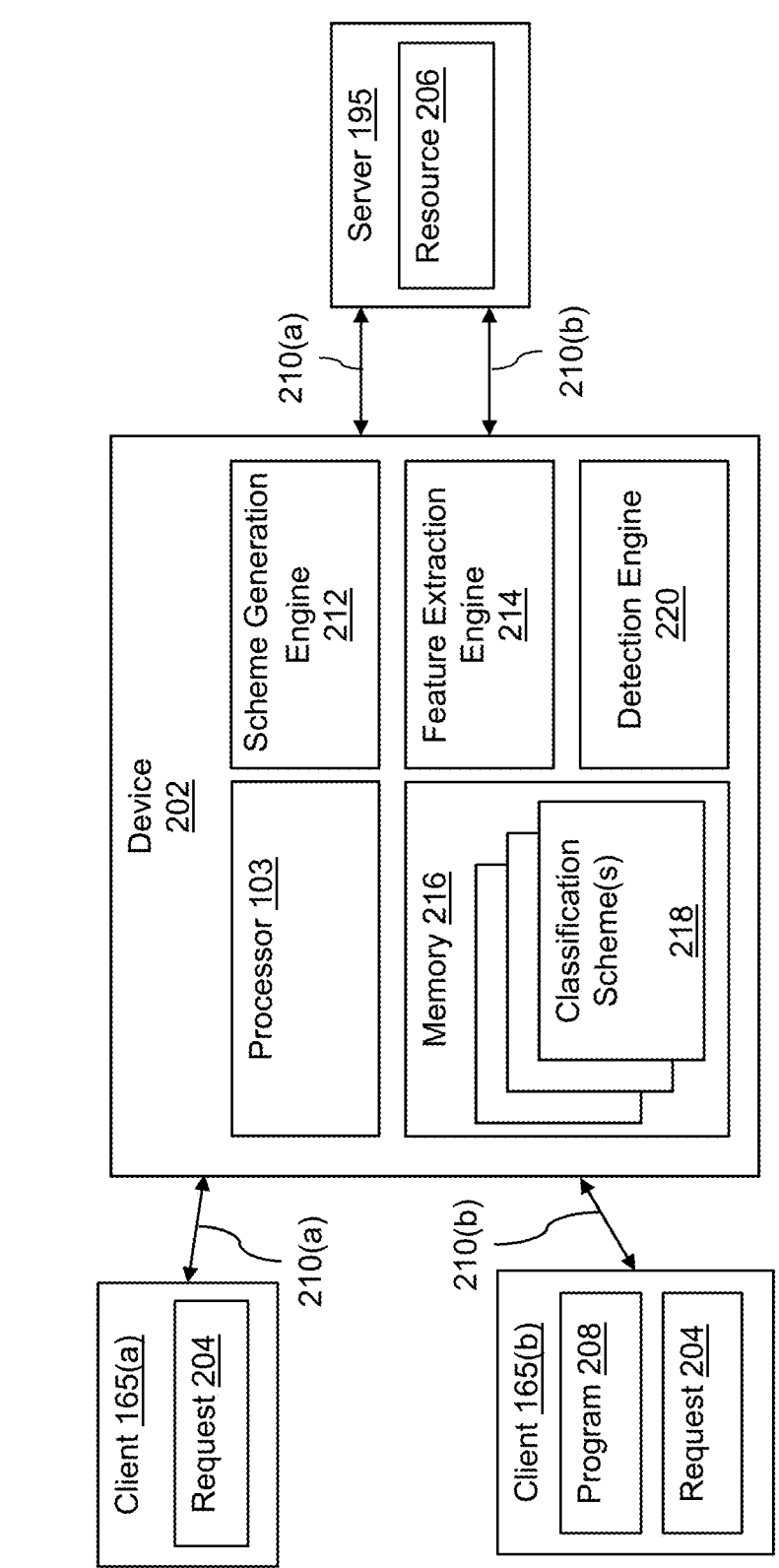
FIG. 2 is a block diagram of a system for autonomous program detection, in accordance with an illustrative embodiment.

Referring now to FIG. 2, depicted is a system 200 for scraping detection, according to an illustrative embodiment. The system 200 may include a device 202 intermediary to a plurality of clients 165 and a plurality of servers 195. The device 202 can handle or process one or more requests 204 from one or more clients 165 to one or more servers 195. The one or more servers 195 may host various resources 206 (such as websites, webpages, applications, and so forth). The clients 165 may access the resources 206 by sending various requests 204 to retrieve data or other content of the resource 206 from the server 195. The device 202 may handle or process one or more responses (e.g., including the data/content requested) from one or more servers 195 to one or more clients 165. As described in greater detail below, the device 202 may be configured to receive requests 204 from a client 165. The device 202 may classify activity of the client 165 as activity of an autonomous program 208 based on a number of the plurality of requests 204, one or more of the content types of the requests 204, and/or a frequency in which the requests 204 are received by the device 202. The device 202 may be configured to block a subsequent request from the client 165 to a server 195 based on the classification of the activity of the client 165 as an autonomous program 208. On the other hand, the device 202 may be configured to permit or allow subsequent requests received from the client 165 to a server 195 based on the classification of the activity of the client 165 as user activity.

The device 202 can be implemented using hardware or a combination of software and hardware. For example, each component of the device 202 can include logical circuitry (e.g., a central processing unit or CPU) that responses to and processes instructions fetched from a memory unit (e.g., memory 216). Each component of the device 202 can include or use a microprocessor 105 or a multi-core processor 105. A multi-core processor 105 can include two or more processing units on a single computing component. Each component of the device 202 can be based on any of these processors, or any other processor capable of operating as described herein. Each processor 105 can utilize instruction level parallelism, thread level parallelism, different levels of cache, etc. For example, the device 202 can include at least one logic device such as a computing device or server having at least one processor 105 to communicate via a network 170. The components and elements of the device 202 can be separate components or a single component. For example, the device 202 can include combinations of hardware and software, such as one or more processors 105 configured to initiate stop commands, initiate motion commands, and transmit or receive event data, for example.

The device 202 can include a memory component (e.g., memory 216) to store and retrieve data. The memory 216 can include a random access memory (RAM) or other dynamic storage device, coupled with the device 202 for storing information, and instructions to be executed by the device 202. The memory 216 can include at least one read only memory (ROM) or other static storage device coupled with the device 202 for storing static information and instructions for the device 202. The memory 216 can include a storage device, such as a solid state device, magnetic disk or optical disk, coupled with the device 202 to persistently store information and instructions.

Clients 165(*a*), 165(*b*) (also referred to herein as "clients 165" or "client 165") can include any form of a computing device described herein. The clients 165 can generate various requests 204 for content/data for at least one server 195, or for an application, resource, website, or other resource 206 provided by at least one server 195. The request 204 can identify or indicate the server 195 and/or the application. The request 204 can identify or indicate the client 165 transmitting the request 204. The client 165 can establish a session 210 between the client 165 and server 195. In some embodiments, the client 165 may establish a respective session 210(*a*), 210(*b*) (also referred to herein as "sessions 210" or "session 210") with the device 202, and the device 202 may establish a corresponding session with the server 210 which is linked or otherwise associated with the client 165. In some embodiments, the client 165 may establish the session 210 between the server 195 and the client 165 (e.g., through the device 202). The client 165 may be configured to transmit, send, or otherwise provide requests 204 via the session 210 to the server 195, and the server 195 may be configured to transmit, send, or otherwise provide responses to the requests via the session 210 to the client 165.

In some embodiments, the sessions 210 may include a channel, connection or linkage between a respective client 165 and the device 202, between the device 202 and a server 195 and/or between a respective client 165 and a server 195. In some embodiments, the sessions 210 can include encrypted and/or secure connections or sessions 210. The encrypted sessions 210 can facilitate exchange of encrypted files, data, content, and/or traffic transmitted between a client 165 and the device 202, between the device 202 and a server 195 and/or between a client 165 and a server 195.

The clients 165 may be configured to generate requests 204. The requests 204 may be or include requests for informational content (such as images, text, HTML, etc.). The requests 204 may be or include requests for rendering instructions (such as scripts, fonts, document object model (DOM), and so forth). The client 165 may generate the requests 204 for content/instructions for sending to a server 195 hosting a website, application, or other web-based resource. The web-based resource may include various pages (i.e., webpages, websites, user interfaces, and so forth) which together form or define the resource 206. As the client 165 establishes a session 210 to the server 195 hosting the resource 206, the client 165 may generate a stream of requests 204 for various resources 206. For example, as the client 165 navigates from various pages of a resource 206, the client 165 may correspondingly generate requests 204 for rendering individual pages of resource 206 by specifying a particular URL of the page of the resource 206 (including requests for content/data which is to be rendered, and instructions for rendering the content/data of the resource 206).

In some embodiments, a client 165 can include or execute an autonomous program 208. In embodiments, an autonomous program 208 can imitate a user, and can initiate a connection or attempt to connect to the device 202. The autonomous program 208 can include or correspond to a bot or web robot configured to behave like a human user of a client 165. For example, the autonomous program 208 can imitate or replace human user behavior and perform tasks, such as but not limited to, retrieving, extracting, requesting, or otherwise scraping data or content from a website, webpage, application, or other resource 206. In some instances, the autonomous program 208 may scrape data or content related to particular types of content. For example, an autonomous program 208 may be designed or configured to scrape images from a website, webpage, application, or resource 206, scrape text (such as prices, block text, etc.) from the resource 206, duplicate entire resources 206, and so forth. The autonomous program 208 may be configured to provide one or more requests 204 to the device 202. For example, the autonomous program 208 can generate a request 204 for the server 195 and forward the request 204 to the device 202.

Servers 195 can include or deploy as, and/or be executed on any type and form of computing device, such as any desktop computer, laptop computer, or mobile device capable of communication over at least one network and performing the operations described herein. For example, servers 195 can include or correspond to one computer, a plurality of computers, or a network of distributed computers such as computer 100 shown in FIG. 1A. In embodiments, servers 195 can execute, support, host, store data corresponding to, or otherwise provide content for one or more applications, webpages, websites, or resources 206. In some embodiments, clients 165 may seek access to hosted resources 206 on servers 195. The resources 206 may include webpages, websites, user interfaces, and so forth of resources 206 that are served from and/or hosted on one or more servers 195 including, but not limited to, a web application, a desktop application, remote-hosted application, a virtual application, a software as a service (SaaS) application, a mobile application, an HDX application, a local application, a native application (e.g., native to the client device), and/or a device couple with one or more of the clients 165.

Each of the above-mentioned elements or entities is implemented in hardware, or a combination of hardware and software, in one or more embodiments. Each component of the device 202 may be implemented using hardware or a combination of hardware or software detailed above in connection with FIGS. 1A-1B. For instance, each of these elements or entities can include any application, program, library, script, task, service, process or any type and form of executable instructions executing on hardware of a client device (e.g., device 202). The hardware includes circuitry such as one or more processors 105 in one or more embodiments.

As described in greater detail below, the device 202 may include various engines for detecting that a client 165 is attempting to scrape or otherwise obtain content/data from a resource 206. In some implementations, the device 202 may include a scheme generation engine 212. The scheme generation engine 212 may be or include any device, component, or hardware configured to generate or otherwise configure a classification scheme 218 (e.g., to be stored in memory 216 or otherwise maintained/accessible by the device 202) for classifying activity of a client 165 as activity of an autonomous program 208 or as activity of a human user of the client 165.

The device 202 may include a feature extraction engine 214. The feature extraction engine 214 may be or include any device, component, or hardware configured to extract features from requests 204 within a session 210 between a client 165 and the server 195 hosting the resource 206. The features extracted from the requests 204 may be used both for development of the classification scheme(s) 218 and/or for classifying the activity of the client 165.

The device 202 may include a detection engine 220. The detection engine 220 may be or include any device, component, or hardware configured to detect a client 165 attempting to scrape or otherwise obtain content from a resource 206. In some embodiments, the detection engine 220 may be configured to apply one or more of the classification schemes to requests 204 from a client 165 to classify the activity of the client 165. The detection engine 220 may be configured to detect a client 165 attempting to scrape or otherwise retrieve content from the resource 206 based on the classification of the activity of the client 165 as activity of an autonomous program 208. On the other hand, the detection engine 220 may be configured to determine that the client 165 is being operated or controlled by a legitimate user accessing the resource(s) 206 based on the classification of the activity of the client 165 as activity of a user.

While described as separate components of the device 202, it is noted that, in some embodiments, two or more of the engines may be combined into a single engine. For example, the feature extraction engine 214 may be incorporated into or a component of the scheme generation engine 212 and/or the detection engine 220. Furthermore, in some embodiments, one or more of the engines may be maintained by a device separate from the device 202. For example, the scheme generation engine 212 may be maintained separate from the device 202 and provide the device 202 access to the classification scheme(s) 218.

Figure 3:
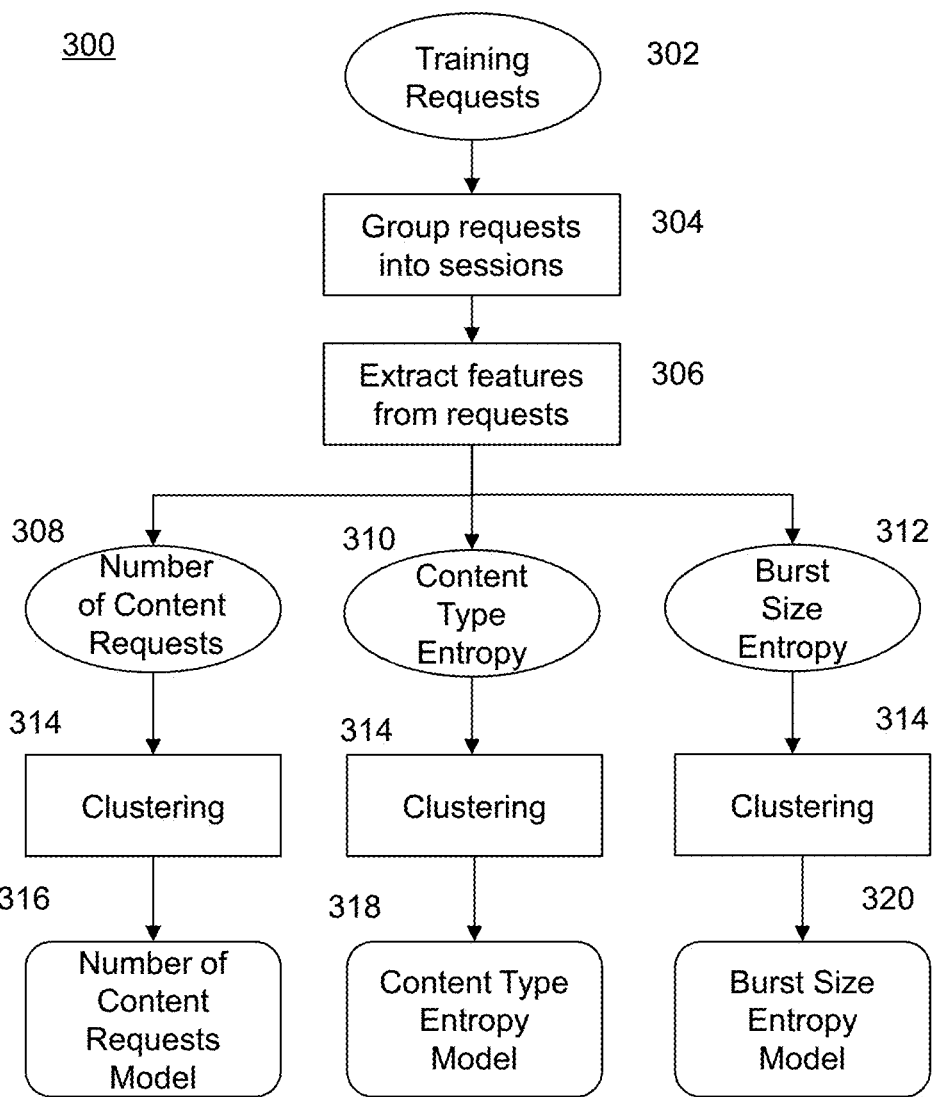
FIG. 3 is a flow diagram of a method for training classification scheme(s) for autonomous program detection systems, in accordance with an illustrative embodiment.

Referring now to FIG. 2 and FIG. 3, the scheme generation engine 212 may be configured to generate, configure or otherwise develop one or more classification scheme(s) 218 for classifying activity of clients 165. Specifically, FIG. 3 is a flow diagram of a method 300 for generating classification schemes 218, in accordance with an illustrative embodiment. As shown in FIG. 3, and as a brief overview, the device 202 may be configured to receive a plurality of requests 204 for content and/or data for a server 195 hosting a resource 206 from clients (step 302). The device 202 may be configured to group the requests 204 into sessions 210 (step 304). The device 202 may be configured to extract features from the group of requests 204 of the session 210 (step 306). Those features may include, for example, a total number of requests 308 (such as a total number of HTML, requests), a content type entropy 310, and a burst size entropy 312. The device 202 may be configured to cluster the featurized requests 204 (step 314). The device 202 may be configured to generate various classification schemes 218 based on the clustered requests. The classification schemes 218 may include, for example, a number of requests classification scheme 316, a content type entropy classification scheme 318, and/or a burst size entropy classification scheme 320.

At step 302, the device 202 may be configured to receive requests 204 or content and/or data for a server 195 hosting a resource 206 from clients 165. In some embodiments, the requests may be or include raw transaction data from various clients 165 which are communicably coupled to the device 202. The requests may be or include unlabeled requests 204 which originate from various clients 165. In such embodiments, the requests 204 may be used to train the classification schemes 218 in an unsupervised manner (e.g., unsupervised training). In some embodiments, the requests may be labeled requests 204. As such, the requests may be processed and labeled (or tagged, flagged, etc.). For example, the requests may include requests 204 that originate from a client 165 executing an autonomous program 208, and may include requests 204 that originate from a client 165 operated, controlled, or otherwise used by a user. The requests may be labeled, tagged, or flagged as originating from a client 165 executing an autonomous program 208 or originating from a client 165 used by a user. In some embodiments, the requests 204 may be preprocessed (e.g., manually, or automatically grouped by the device 202 based on clients 165 executing an autonomous program for training purposes, etc.) to assign labels indicating that the requests 204 originate from a client 165 executing an autonomous program 208 or originate from a client 165 used by a user. In such embodiments, the requests 204 may be used to train the classification schemes 218 in a supervised manner (e.g., supervised training). When the classification schemes 218 are trained in a supervised manner, the classification schemes 218 may be specific to each resource, as different resources may use different workflows and correspondingly be accessed differently by clients 165. In some embodiments, the requests 204 may be used to train additional or alternative classification schemes, such as inter-burst time (e.g., a time between a first and second burst), inter-request time (e.g., a time between a first and second request), etc. In some embodiments, the classification schemes may be or include a supervised classification scheme, such as random forest or other supervised classification scheme.

At step 304, the device 202 may be configured to group the requests 204 into sessions 210. In some embodiments, individual requests 204 may be linked to a particular session 210 between the client 165 and the server 195. For example, the device 202 may be configured to assign an identifier (e.g., a number, tag, alphanumeric string, etc.) to a session 210 (also referred to as a "session identifier"). In some embodiments, the device 202 may be configured to generate, establish, derive, or otherwise provide the identifier based on, for example, an internet protocol (IP) address of the client 165, the IP address in combination with a user identifier, a token extracted from a first request 204 (e.g., from a header of the first request 204, from a uniform resource locator (URL) from the request 204, from a cookie set at the client 165 which sent the first request 204, etc.), and/or a combination thereof. The device 202 may be configured to incorporate, embed, or otherwise provide the identifier to individual requests 204 received by the device 202 in the session 210. As such, individual requests 204 within a session 210 may include the identifier assigned by the device 202 to the session 210. The device 202 may be configured to group the requests 204 into sessions 210 by identifying individual requests 204 (e.g., received at step 302) which have a common or shared session identifier. For example, as part of development of the classification scheme(s) 218, the device 202 may be configured to group the requests 204 originating from the client 165(*a*) on session 210(*a*) into a first set of requests 204, and group the requests 204 originating from the client 165(*b*) on session 210(*b*) into a second set of requests 204. As such, individual sets of requests 204 may be grouped according to a particular session 210 between a specific client 165 with the server 195 hosting the resource 206.

At step 306, the device 202 may be configured to detect, determine, identify, or otherwise extract features from the group of requests 204 of the session. In some embodiments, the feature extraction engine 214 may be configured to extract features from the group of requests 204. In some embodiments, the feature extraction engine 214 may be configured to extract features from the requests 204 individually or from a plurality of requests 204 grouped according to a particular session 210. As described above, individual requests 204 may include requests 204 from the clients 165 for content/data from the server 195 of a resource 206 hosted on the server 195, and/or requests 204 for instructions for rendering the resource 206 at the client 165 (i.e., rendering a user interface, webpage, website, etc. of the resource 206). The feature extraction engine 214 may be configured to determine a total number of requests 204 within a session 210 between the client 165 and the server 195. The feature extraction engine 214 may be configured to generate or determine a count of the total number of requests 204 within the session 210 (e.g., by determining the number of requests 204 which have a common session identifier). Additionally, individual requests 204 may include a timestamp (e.g., indicating a time in which the request was sent by the client 165, a time in which the request was received by the device 202, etc.). The feature extraction engine 214 may be configured to extract, determine, or otherwise identify the timestamp for individual requests 204.

In some embodiments, the feature extraction engine 214 may be configured to determine a count of a total number of requests for content. For example, the feature extraction engine 214 may be configured to determine a count of requests for content (as opposed to requests for instructions for rendering a resource 206). The feature extraction engine 214 may be configured to parse individual requests 204 received from the client 165 to determine which are requesting content and which are requesting instructions for rendering the resource 206. For example, the requests 204 may include data which identifies the particular information/data is requested (e.g., the requests 204 may indicate, identify, or otherwise specify that image or JAVASCRIPT content is requested, text content is requested, HTML content is requested, etc.). The feature extraction engine 214 may be configured to determine a count of the requests 204 which identify that informational content is requested (rather than requests for instructions for rendering the resource 206, such as a DOM, script, fonts, etc.). The count of requests 204 which identify that informational content is requested is also referred to herein as "number of content requests 608").

The feature extraction engine 214 may be configured to determine, detect, or otherwise identify a total number of pages (i.e., webpages, user interface pages, websites, etc.) of the resource 206 accessed within the session 210. As described above, when a client 165 navigates to a page of the resource 206, the client 165 may transmit a request 204 via the session 210 (e.g., an HTML request) which specifies the URL of the page of the resource 206 from which data (e.g., content, rendering instructions, etc.) is requested. As such, the requests 204 which are associated with a particular page of the resource 206 may individually specify the same URL for the page of the resource 206. The feature extraction engine 214 may be configured to detect, determine, quantify, or otherwise identify the total number of pages of the resource 206 accessed by the client 165 by determining which of the requests 204 specify the same URL for a page of the resource 206. In other words, the feature extraction engine 214 may be configured to determine a total number of URLs for resources 206 provided by the client 165 via the session 210. The feature extraction engine 214 may be configured to determine a total number of HTML requests 204 based on the total number of URLs for resources 206.

The feature extraction engine 214 may be configured to determine, detect, or otherwise identify a count of content types requested by the client 165 via the session 210. As described above, the client 165 may generate requests 204 for specific content, and requests 204 for instructions for rendering the content. The requests for specific content may include requests for text (such as prices, block text, product names, names of people, email addresses, and so forth), requests for graphics (such as product images, user profile images, video demonstrations, user-generated graphical content including photographs, paintings or artwork, videos, product symbols or logos, and so forth), and other related content which is typically included or provided in various pages of a resource 206. In some embodiments, the clients 165 may generate separate requests for different types of content (e.g., a first request for text, a second request for graphics/images, a third request for HTML), and separate requests for rendering instructions (e.g., a fourth request for a DOM or scripts, a fifth request for fonts, etc.). The feature extraction engine 214 may be configured to parse individual requests 204 from the client 165 to assign requests 204 to a specific content type grouping (e.g., assign a first set of requests to an images content type grouping, a second set of requests to a text content type grouping, etc.). The feature extraction engine 214 may be configured to determine a count of the groupings which have been assigned requests 204 from the client 165. As an example, where a particular client 165 has generated requests 204 only for text and not images, the requests 204 may only be assigned to the text content type grouping. As such, the feature extraction engine may determine the count to be one (e.g., one for text content type grouping, and zero for images content type grouping). In some embodiments, the feature extraction engine 214 may determine the number of requests 204 assigned each of the content type groupings. As described above, the feature extraction engine 214 may be configured to assign individual requests 204 to a corresponding content type grouping. The feature extraction engine 214 may be configured to determine a respective count of the number of requests 204 which are assigned to different content type groupings (e.g., 24 requests assigned to text content type grouping, 46 requests assigned to the images content type grouping).

In some embodiments, the feature extraction engine 214 may be configured to determine an entropy of the content types requested. As used herein, entropy refers to a numerical value or range of values which represent a probability of a change over time. In the context of content types requested by a client 165, a given client 165 which is operated by a user may request any number of content types (which is typically consistent over time). As such, the probability of a change in the types of content over time is relatively high. On the other hand, a given client 165 which is executing an autonomous program 208 to generate requests 204 may only request certain types of content (for example, only images, only text, etc.). Typically, an autonomous program 208 may be programmed to collect certain types of content for scraping purposes. For example, a price-scraping autonomous program 208 may be programmed to scrape webpages of e-commerce resources 206 for text content (i.e., to only obtain product text and product prices). Therefore, rather than the price-scraping autonomous program 208 requesting all of the content (i.e., text content, image content, rendering instructions, and so forth), the price-scraping autonomous program 208 may only generate requests for text content. The price-scraping autonomous program 208 may only generate requests for text content because requesting all of the content for the resource 206 may generally result in more requests and responses, thereby slowing down the price-scraping autonomous program 208. Instead, the price-scraping autonomous program 208 only generates targeted requests for content (i.e., text content) in which the price-scraping autonomous program 208 is designed or programmed to request. As such, the probability of a change in the types of content requested by the autonomous program 208 is relatively low (since the autonomous program is unlikely to request different content types other than text content in the example described above). The low probability of a change may be because the autonomous program 208 is executable to only request certain types of content (such as only images, prices, text, etc.), rather than requesting content and data for rendering an entire resource 206. In some embodiments, the feature extraction engine 214 may be configured to determine the entropy of the content types requested using Shannon's Entropy equation, or $E=\Sigma_i(p(i)\times \log_2(p(i)))$. In some embodiments, the i-values used in the Shannon's Entropy equation may include a total number of requests in the session, the total number of unique URLs in the session, the total number of different content-types accessed during the session, the count of the requests for each content type, and/or the count of the total number of requests to fetch informational content.

The feature extraction engine 214 may be configured to compile or otherwise process individual requests 204 which are for content (e.g., those requests 204 which are in the number of content requests). The feature extraction engine 214 may be configured to determine, based on the timestamps for each of the requests 204 and the count of requests 204 for individual types of content requested, a change of the count of requests 204 for that type of content over time. The feature extraction engine 214 may be configured to compute a probability of the change in the types of content over time. For example, where the client 165 generates requests 204 for the same type of content (such as only requests 204 for text) over an extended period of time, the probability of the types of content continuing to be requested over time may be high. The feature extraction engine 214 may be configured to compute, calculate, or otherwise determine the entropy of the content types based on the probability.

The feature extraction engine 214 may be configured to determine a frequency of requests 204 from the client 165. In some embodiments, the feature extraction engine 214 may be configured to determine the frequency over a time duration (such as over 2 ms, 2.5 ms., 3 ms, 5 ms, 10 ms, 20 ms, etc.). The time duration may coincide with or correspond to requests for rendering a new page of the resource 206. For example, when a client 165 navigates to a page of the resource 206, the client 165 may be configured to generate a request for HTML of the page of the resource 206. The server 195 may be configured to generate a response including the HTML. The HTML may include references to other data or content, such as CSS, JAVASCRIPT, images, fonts, etc. which are used to render the page of the resource 206. When the client 165 receives the HTML for the resource 206, the client 165 may correspondingly generate a burst (or set) of requests 204 for individual data/content referenced in the HTML for the resource 206. Each of the requests 204 may be sent over a relatively short period of time (e.g., within the time duration from the first and last request 204 of the set of requests 204). Since the requests 204 are timestamped, the device 202 may be configured to group each of the requests 204 from a "burst" or set. For example, the feature extraction engine 214 may be configured to identify individual requests 204 which are within the time duration (e.g., each of the requests 204 which are sent within the time duration from a first request 204) using the timestamps from the requests 204. The feature extraction engine 214 may be configured to group the requests 204 which are within the time duration as a set of requests 204 (or a "burst" of requests 204).

The feature extraction engine 214 may be configured to determine a total number of bursts (or sets of requests 204 which are within a time duration) within a session 210. As described above, the feature extraction engine 214 may be configured to group requests 204 which are within the time duration. The feature extraction engine 214 may be configured to determine a count of the groups of requests 204 (i.e., a count of the bursts). In some embodiments, the feature extraction engine 214 may be configured to determine a respective count of the requests 204 from a group of requests 204. For instance, as the client 165 navigates to individual pages of resources 206, the client 165 may correspondingly generate bursts or groups of requests 204 as part of navigating to the respective pages of the resource 206. The feature extraction engine 214 may be configured to determine a count of the number of requests 204 for different bursts (or group of requests). In some embodiments, the feature extraction engine 214 may be configured to compute an entropy of the count of the number of requests 204 for different bursts (e.g., a burst size entropy). The burst size entropy may be similar in some respects to the content type entropy, as the burst size entropy may be a numerical value or range of values which represent a probability of a change in the number or frequency of requests over time. The feature extraction engine 214 may be configured to determine, compute, or otherwise calculate the burst size entropy using the count of the number of requests 204 for different bursts (or groups/sets of requests within the time duration).

A step 314, the device 202 may be configured to cluster features extracted from the requests 204. In some embodiments, the scheme generation engine 212 may be configured to cluster the features extracted by the feature extraction engine 214 from the requests 204. In some embodiments, the scheme generation engine 212 may include or otherwise access an unsupervised clustering techniques configured to group featurized requests from clients 165 together to form clusters. For example, the clustering techniques may be configured or designed to group similar vectors (e.g., featurized datasets corresponding to individual sessions 210) into clusters. In some embodiments, the clustering techniques may be a density-based spatial clustering of applications with noise (DBSCAN) clustering algorithm. Given that a large majority of clients 165 accessing a resource 206 or series of resources 206 are not executing an autonomous program, the activity of those clients 165 may cluster together (since their activity would be similar). On the other hand, clients 165 which access the resource 206 and are executing an autonomous program 208 may be outliers or noise from the clusters. In such embodiments, the DBSCAN clustering methods may cluster the activity of clients 165 which are operated (or controlled/used) by users, and cluster activity of clients 165 which are executing an autonomous program.

Figure 4:
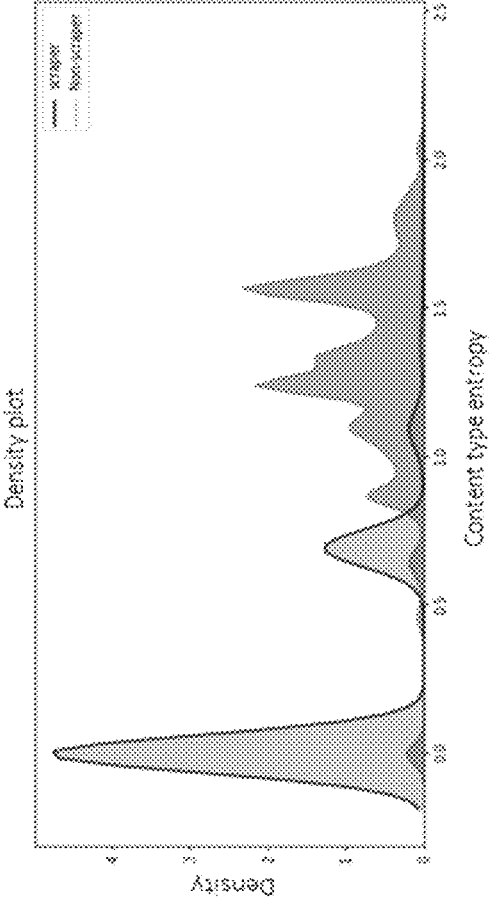
FIG. 4 is graph showing a density plot for an entropy of content types, in accordance with an illustrative embodiment.
Figure 5:
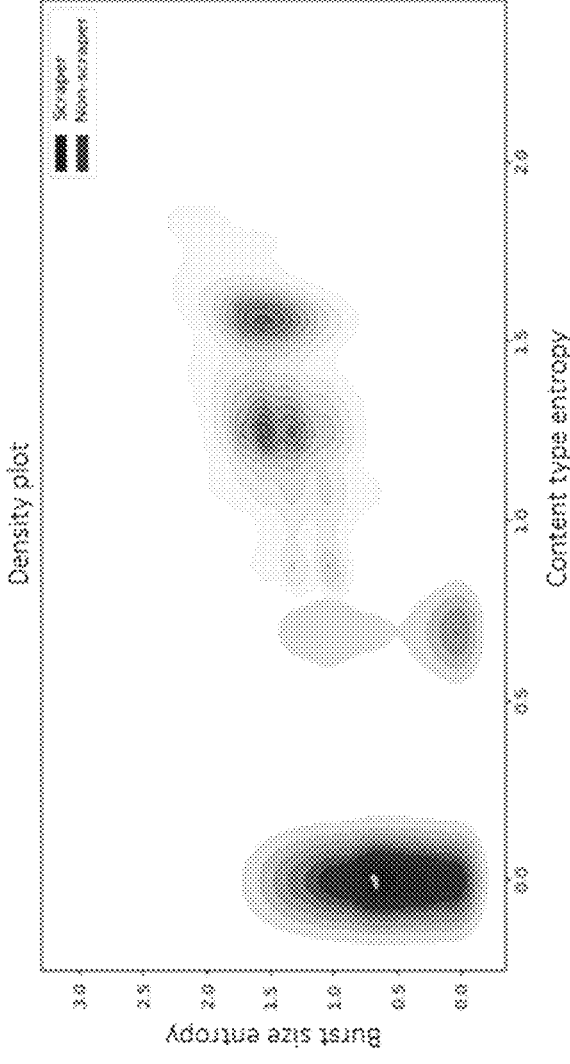
FIG. 5 is a graph showing a density plot for an entropy of content types in comparison to a frequency of requests over a time duration, in accordance with an illustrative embodiment.

Referring briefly to FIG. 4 and FIG. 5, scheme generation engine 212 may be configured to generate clusters using the extracted features from the requests 204. Specifically, FIG. 4 is graph 400 showing a density plot for an entropy of content types (e.g., content type entropy), and FIG. 5 is a graph showing a density plot for an entropy of content types (e.g., content type entropy) in comparison to a frequency of requests over a time duration (e.g., burst size entropy), in accordance with illustrative embodiments. In the examples shown in FIG. 4 and FIG. 5, the requests 204 may be from a dataset of requests 204 to resources 206 of an e-commerce store. In these examples, the clusters show a clear distinction between activity of clients 165 which execute an autonomous program 208 and activity of clients 165 which are operated by a user. Specifically, in FIG. 4, activity of the clients 165 which execute an autonomous program 208 commonly has a low content type entropy (i.e., because clients 165 executing an autonomous program 208 are commonly requesting the same types of content). This phenomenon is illustrated by the spikes in density of content type entropy at 0.0 and 0.6. On the other hand, activity of clients 165 which are operated by a user commonly has a broader spectrum of content type entropy (i.e., because the clients 165 operated by a user are commonly requesting wider variety of content for rendering entire pages of resources 206 rather than targeted content). Furthermore, as shown in FIG. 5, the distinction between activity of clients 165 which execute an autonomous program 207 and activity of clients 165 which are operated by a user is shown when measuring content type entropy together with burst size entropy. Specifically, the X-axis of the graph 500 is content type entropy and the Y-axis of the graph 500 is burst size entropy. As illustrated in FIG. 5, clients 165 which execute autonomous program typically have low burst size entropy and low content type entropy (as the clients 165 will repeatedly request the same types of content and therefore both the burst sizes and content types will typically not change between bursts), which is reflected in the cluster closest to the origin of the X and Y-axes. On the other hand, clients 165 which are operated by a user will typically have higher burst size entropy (as the clients 165 will typically request wider varieties of content depending on the particular resource 206 accessed, and the size of the bursts will correspondingly change).

Referring back to FIG. 2 and FIG. 3, the scheme generation engine 212 may be configured to use the clusters from step 314 to generate classification schemes 218. In some embodiments, the scheme generation engine 212 may be configured to generate the classification schemes 218 based on a particular range of values which encompasses or otherwise includes specific clusters. For example, and as shown in FIG. 4, the scheme generation engine 212 may be configured to generate the classification schemes 218 to specify that certain ranges of values extracted from activity of a client 165 is to be classified as autonomous program activity (i.e., activity of clients 165 which has a content type entropy of between 0.0 and 0.7 is to be classified as activity of an autonomous program). In some embodiments, the scheme generation engine 212 may be configured to automatically generate the classification schemes 218 based on outlier clusters identified by the scheme generation engine 212. For example, the scheme generation engine 212 may be configured to cluster the activity of the clients 165, and assign outlier clusters to autonomous program activity.

In some embodiments, the scheme generation engine 212 may be configured to generate a plurality of classification schemes 218. For example, the scheme generation engine 212 may be configured to generate a classification scheme 218 for a number of content requests in a session (i.e., number of content requests classification scheme 316). The number of content requests classification scheme 316 may be configured to identify activity of clients 165 as activity of an autonomous program 208 based on the total number of requests for content in a session. For example, where the total number of requests exceeds a threshold which is atypical for user activity, the number of content requests classification scheme 316 may generate an output classifying the activity of the client 165 as autonomous program activity.

In some embodiments, the scheme generation engine 212 may be configured to generate a content type entropy classification scheme 318. The content type entropy classification scheme 318 may be configured to identify activity of clients 165 as activity of an autonomous program 208 based on the change in the types of content requested over time. For example, where the content type entropy is low (i.e., between 0.0 and 0.7 as shown in FIG. 4-FIG. 5), the client 165 is typically requesting the same content over the session. As such, the client 165 may be attempting to scrape and collect such content, and the probability of the types of content requested changing over time may be low. Where the content type entropy for activity of a client 165 in a session falls below a threshold which is atypical for user activity (i.e., between 0.0 and 0.7, for instance), the content type entropy classification scheme 318 may generate an output classifying the activity of the client 165 as autonomous program activity.

In some embodiments, the scheme generation engine 212 may be configured to generate a burst size entropy classification scheme 320. The burst size entropy classification scheme 320 may be configured to identify activity of clients 165 as activity of an autonomous program 208 based on the change in the number of requests 204 within a time duration over time (in other words, a frequency in the requests). For example, where the burst size entropy is low (i.e., less than 1.0 as shown in FIG. 5), the client 165 is typically requesting the same content over the session and the burst sizes are therefore similar. As such, the client 165 may be attempting to scrape or otherwise attempt to collect such content, and the probability of the burst size changing over time may be low. Where the burst size entropy for activity of a client 165 in a session falls below a threshold which is atypical for user activity (i.e., less than a predetermined threshold, such as 1.2), the burst size entropy classification scheme 320 may generate an output classifying the activity of the client 165 as autonomous program activity.

Figure 6:
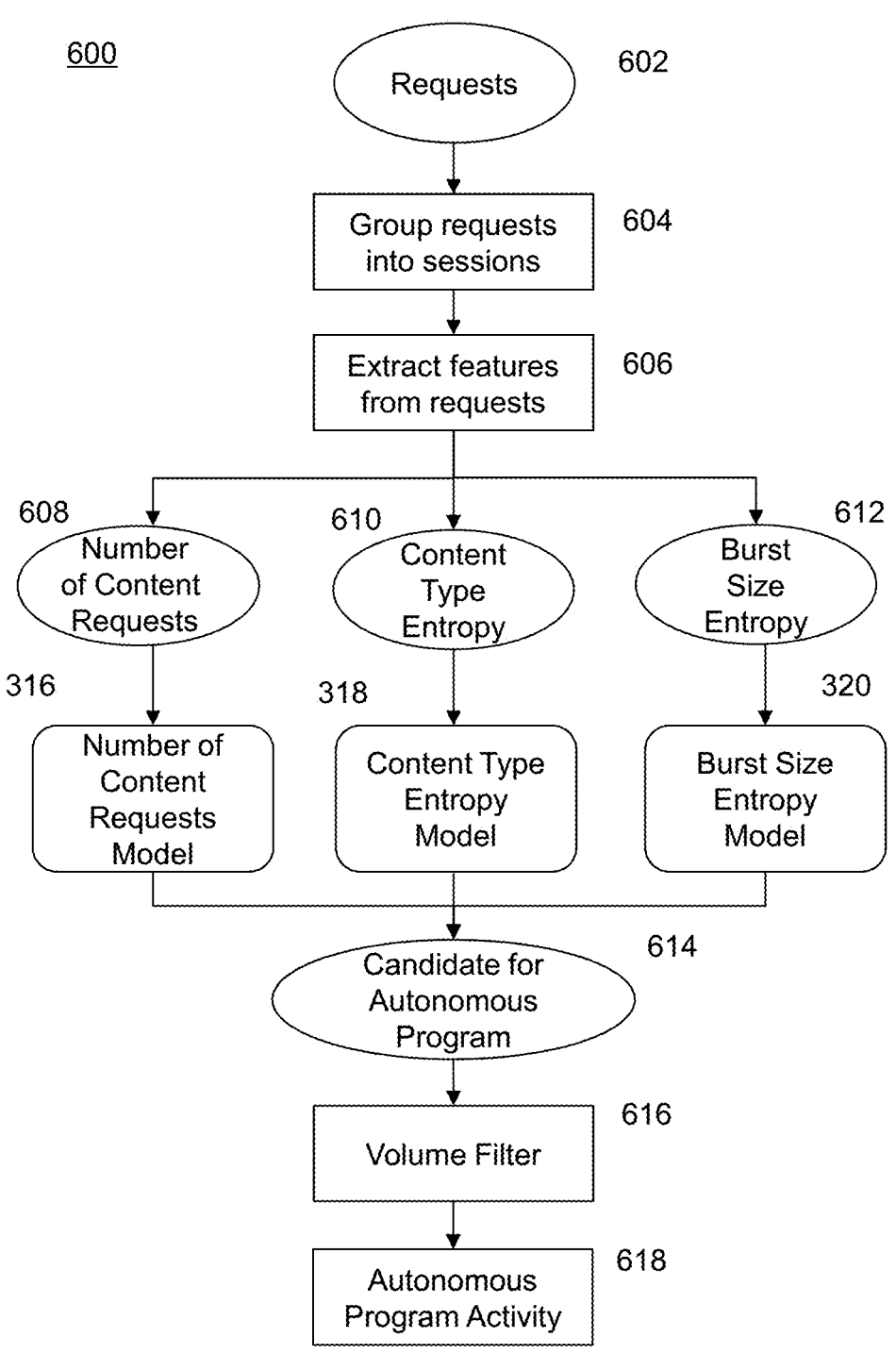
FIG. 6 is a flow diagram of a method of classifying activity of clients, in accordance with an illustrative embodiment.

Referring now to FIG. 2 and FIG. 6, the detection engine 220 may be configured to use the classification schemes 218 to classify activity of clients 165 as autonomous program (or user) activity. Specifically, FIG. 6 is a flow diagram of a method 600 for classifying activity of clients 165, in accordance with an illustrative embodiment. Several of the steps illustrated in FIG. 6 may be similar to those described above with reference to FIG. 3. As a brief overview, the device 202 may be configured to receive requests 204 (step 602). The device 202 may be configured to group requests 204 into sessions 210 (step 604). The device 202 may be configured to extract features from the requests 204 (step 606). Those features may include a number of content requests (step 608), a content type entropy (step 610), and/or a burst size entropy (step 612). The device 202 may be configured to apply the featurized requests to the classification schemes 218 (e.g., using the number of content requests classification scheme 316, the content type entropy classification scheme 318, and/or burst size entropy classification scheme 320) to identify clients 165 as potentially executing an autonomous program (step 614). The device 202 may be configured to apply a volume filter to the requests 204 (step 616), which may be performed at any point during the method 600. The device 202 may be configured to classify activity of clients 165 as autonomous program activity based on the output(s) from one or more of the classification schemes 218 (step 618).

At step 602, the device 202 may be configured to receive requests 204. In some embodiments, the device 202 may be configured to receive a plurality of requests 204 from a plurality of clients 165. Individual clients 165 may maintain a session between the respective client 165 and the server 195 which is hosting a resource 206. The resource 206 may be or include a website, application, or other resource, and may include various pages (i.e., webpages, user interfaces, etc.). To access a resource 206, a client 165 may generate a first request 204 for the server 195 which requests, for example, HTML for the resource 206. The server 195 may generate a response to the request 204 which includes the HTML for rendering the resource 206. The HTML may reference additional data/content, such as text, images, JAVASCRIPT, etc. Once the client 165 receives the HTML for the resource 206, the client 165 may be configured to generate a series of requests 204 which requests the additional data/content referenced in the HTML, for the server 195. Each of the requests 204 described above may be routed through the device 202 such that the device 202 receives the requests 204/responses which are exchanged via the session 210 between the client 165 and server 195. The requests 204 transmitted from the clients 165 to the server 195 is generally referred to herein as "activity" of the client 165. Additionally, the requests 204 may be real-time requests 204 which originate from a client 165 during the session 210.

At step 604, the device 202 may be configured to group requests 204 into sessions 210. In some embodiments, the feature extraction engine 214 may be configured to group requests 204 originating from a client 165 for a resource hosted on a server 195 into a session 210 of the client 165. Step 604 may be similar to step 304 described above with reference to FIG. 3. For example, and with reference to FIG. 2, the device 202 may be configured to group requests 204 originating from client 165(*a*) for the server 195 into a first session 210(*a*), and group requests 204 originating from client 165(*b*) for the server 195 into a second session 210(*b*). In some embodiments, the clients 165 may be configured to include, incorporate, or otherwise provide an identifier indicative of a session in the requests 204 (which may be generated by the clients 165, may be generated by the device 202 and provided to the clients 165, etc.). The device 202 may be configured to parse the requests 204 received from the clients 165 to extract, determine, or otherwise identify the session identifier included in the requests 204. The device 202 may be configured to group requests 204 which include a common or shared session identifier.

At step 606, the device 202 may be configured to extract features from the requests 204. Those features may include a number of content requests (step 608), a content type entropy (step 610), and/or a burst size entropy (step 612). In some embodiments, the feature extraction engine 214 may be configured to extract the features from the requests 204. In some embodiments, the feature extraction engine 214 may be configured to extract features from the activity on the session 210 based on data from the plurality of requests 204 (e.g., the number of requests, the content which was requested, the timestamps from the requests 204). In this regard, step 606 may be similar to step 306 described above with reference to FIG. 3.

The feature extraction engine 214 may be configured to determine a count of a total number of requests 204 which request content (e.g., count or number of content requests 608). For example, the requests 204 for content may request the content/data identified or referenced in HTML for a resource 206 (i.e., rather than the HTML itself, or instructions for rendering the resource 206). The feature extraction engine 214 may be configured to parse the requests 204 from the client 165 to determine a type of data which is requested by the client 165. The feature extraction engine 214 may be configured to determine the count using the requests 204 which request content data (i.e., images, text, JAVASCRIPT, video or graphics, etc.).

In some embodiments, the feature extraction engine 214 may be configured to determine a content type entropy (610) of the requests 204 for content. The feature extraction engine 214 may be configured to compute or determine the content type entropy (610) similar to the content type entropy described above with reference to step 310 of FIG. 3. In this regard, the content type entropy (610) may be a numerical value or range of values which reflect a probability of a change in the types of content requested by the client 165 over time. The feature extraction engine 214 may be configured to compute or determine the content type entropy (610) as a function of the types of content requested by the client 165 over time. In some embodiments, the feature extraction engine 214 may be configured to determine a burst size entropy (612). As described above, the requests 204 which originate from the client 165 within specified time duration may be classified or grouped as a "burst" of requests 204. These requests 204 may each correspond to rendering a particular page of the resource 206 provided by the server 195. As described with reference to step 312 of FIG. 3, the burst size entropy (612) may be a numerical value or range of values which reflect a probability of the frequency or number of requests within the "burst" of requests 204 changing over time. The feature extraction engine 214 may be configured to compute or determine the burst size entropy as a function of the number or count of requests within a "burst" of requests 204 over time.

At step 614, the device 202 may be configured to apply the featurized requests to classification schemes 218 (e.g., the number of content requests classification scheme 316, the content type entropy classification scheme 318, and/or burst size entropy classification scheme 320) to identify clients 165 as potentially executing an autonomous program 208. In some embodiments, the detection engine 220 may be configured to apply the featurized requests to the classification schemes 218. As described above with reference to FIG. 3-FIG. 5, the classification schemes 218 may include numerical ranges of values which correspond to featurized requests (or activity) of clients 165 which may indicate that the client 165 is executing an autonomous program. In some embodiments, the detection engine 220 may be configured to apply the number of content requests 608 with use of the number of content requests classification scheme 316, the content type entropy 610 of the requests 204 from the client 165 with use of the content type entropy classification scheme 318, and/or the burst size entropy 612 of the bursts from the client 165 with use of the burst size entropy classification scheme 320. In some embodiments, the classification scheme(s) 218 may be configured to generate one or more outputs based on the featurized requests 204 from the client 165.

In some embodiments, the classification scheme(s) may be configured to generate a first output responsive to the featurized requests having a value which is within or satisfies a range indicating activity of the client 165 may be autonomous program activity, and generate a second output responsive to the featurized request having a value which is not within or not satisfy the range (or satisfies a second range indicating that the activity of the client 165 may be activity originating from a user operating the client 165). For example, where the content type entropy is less than 0.7 (as shown in FIG. 4 and FIG. 5), the content type entropy classification scheme 318 may generate a first output which indicates that the activity of the client 165 may be autonomous program activity. On the other hand, where the content type entropy is greater than 0.7, the content type entropy classification scheme 318 may generate a second output which indicates that the activity of the client 165 may be activity originating from a user operating the client 165. As another example, where the number of content requests 204 exceeds a value (e.g., a predetermined value), the number of content requests classification scheme 316 may generate a first output which indicates that the activity of the client 165 may be autonomous program activity. On the other hand, where the number of content requests is less than the value, the number of content requests classification scheme 316 may generate a second output which indicates that the activity of the client 165 may be activity originating from a user operating the client 165. As yet another example, where the burst size entropy is less than 1.2 (as shown in FIG. 5), the burst size entropy classification scheme 320 may generate a first output which indicates that the activity of the client 165 may be autonomous program activity. On the other hand, where the burst size entropy is greater than 1.2, the burst size entropy classification scheme 320 may generate a second output which indicates that the activity of the client 165 may be activity originating from a user operating the client 165.

At step 618, the device 202 may be configured to classify activity of clients 165 as autonomous program activity based on the output(s) from one or more of the classification schemes 218. In some embodiments, the detection engine 220 may be configured to classify the activity of the clients 165 as activity of an autonomous program 208 (i.e., autonomous program activity) based on the outputs from the one or more of the classification schemes 218. The detection engine 220 may be configured to classify the activity of the client 165 based on outputs from one or more of the models 218. In some embodiments, the detection engine 220 may be configured to classify the activity of the client 165 based on outputs from a plurality (or subset of the plurality) of classification schemes 218.

In some embodiments, where each of the classification schemes 218 generate an output having the first value (i.e., indicating that the activity of the client 165 may be autonomous program activity), the detection engine 220 may be configured to classify the activity of the client 165 as autonomous program activity. On the other hand, where each of the classification schemes 218 generate an output having the second value (i.e., indicating that the activity of the client 165 may be user activity), the detection engine 220 may be configured to classify the activity of the client 165 as user activity.

In some instances, the classification schemes 218 may generate outputs for activity which includes both the first and second value. For example, the number of content requests classification scheme 316 may generate an output having the second value, and the content type entropy model 318 and burst size entropy classification scheme 320 may generate outputs having the first value. The detection engine 220 may be configured to maintain, include, or otherwise access one or more rules for classifying the activity of the client 165 where the classification schemes 218 generate inconsistent outputs.

In some embodiments, the detection engine 220 may include or access a first rule which indicates that, where the content type entropy classification scheme 318 and burst size entropy classification scheme 320 both generate outputs having the first value (i.e., indicating that the activity of the client 165 may be autonomous program activity), the activity is to be classified as autonomous program activity. In this regard, where the content type entropy of the activity and the burst size entropy of the activity satisfies the respective classification schemes 318, 320, the detection engine 220 may be configured to classify the activity of the client 165 as autonomous program activity.

In some embodiments, the detection engine 220 may include or access a second rule which indicates that, where the number of content requests classification scheme 316 and one of the content type entropy classification scheme 318 and burst size entropy classification scheme 320 both generate outputs having the first value (i.e., indicating that the activity of the client 165 may be autonomous program activity), the activity is to be classified as autonomous program activity. In this regard, where 1) the number of content requests satisfies a value provided by the number of content requests classification scheme 316 and 2) either the content type entropy of the activity or the burst size entropy of the activity satisfies the respective classification schemes 318, 320, the detection engine 220 may be configured to classify the activity of the client 165 as autonomous program activity.

In some embodiments, the detection engine 220 may include or access a third rule which indicates that, where the content type entropy classification scheme 318 and burst size entropy classification scheme 320 both generate outputs having the second value (i.e., indicating that the activity of the client 165 may be user activity), the activity is to be classified as user activity. In this regard, where the content type entropy of the activity and the burst size entropy of the activity do not satisfy the respective classification schemes 318, 320, even if the number of content requests 608 satisfies a value provided number of content requests classification scheme 316, the detection engine 220 may be configured to classify the activity of the client 165 as user activity.

In some embodiments, the detection engine 220 may be configured to apply one or more filters to the requests 204. For example, at step 616, the detection engine 220 may be configured to apply a volume filter to the requests 204. While shown as being located between steps 614 and 618, it is noted that the detection engine 220 may be configured to apply the volume filter at any point in method 600 (i.e., between step 604 and step 606, between step 606 and step 614, etc.). In some embodiments, the detection engine 220 may be configured to apply a filter based on the pages of the resources 206 requested. For example, and as described above, when the clients 165 generate requests 204 for a page of the resource 206, the clients 165 may include an address (i.e., a URL) for the resource 206 in the request 204. The detection engine 220 may be configured to group requests 204 for resources 206 using the address included in the request 204. The detection engine 220 may be configured to determine a number or count of addresses included in the requests 204. The detection engine 220 may be configured to apply a volume filter to the number or count of addresses included in the request 204. In some embodiments, the volume filter may be unique to the particular resource. For example, some resources 206 may include a large number of pages, whereas other resources 206 may only include a few pages. Table 1 below shows an example of various volume filters which may be applied to requests 204 for the e-commerce resource used to generate the clusters shown in FIG. 4-FIG. 5.

TABLE 1

| | Volume Filters for E-Commerce Resource | | | | | |
|---|---|---|---|---|---|---|
| | Address > 10 | Address > 20 | Address > 50 | Address > 100 | Address > 200 | Address > 500 |
| Scraping Sessions | 7288 | 4905 | 2457 | 1633 | 984 | 393 |
| User Sessions | 109298 | 88807 | 46105 | 19798 | 5975 | 612 |
| True Positive | 5161 | 3566 | 2094 | 1464 | 899 | 370 |
| False Positive | 2260 | 167 | 72 | 53 | 45 | 45 |
| True Negative | 107038 | 88640 | 46033 | 19745 | 5930 | 567 |
| False Negative | 2127 | 1339 | 363 | 169 | 85 | 23 |
| Precision | 0.695 | 0.955 | 0.967 | 0.965 | 0.952 | 0.892 |
| Recall | 0.708 | 0.727 | 0.852 | 0.897 | 0.914 | 0.941 |
| F-measure | 0.702 | 0.826 | 0.906 | 0.93 | 0.933 | 0.916 |

Table 1 shows a number of sessions 210 of clients 165 which are executing an autonomous program 208, and a number of sessions 210 of clients 165 which are operated (or used) by users (i.e., legitimate users). Table 1 also includes values based on outputs from the classification schemes 218 including a number of true positives, false positives, true negatives, false negatives, and values corresponding to a precision, recall, and F-measure. The detection engine 220 may be configured to select the volume filter as a function of, for example, the value for the precision, the recall, and/or the F-measure. For example, the detection engine 220 may be configured to select the lowest volume filter which has a precision greater than 0.95 (or a volume filter of greater than or equal to 20 addresses). The detection engine 220 may be configured to apply the volume filter to the activity of the client 165. Where the activity of the client does not satisfy the volume filter (i.e., continuing the example above, the requests 204 from the client 165 includes less than 20 addresses for different pages of the resource 206), the detection engine 220 may not classify the activity of the client 165. On the other hand, where the activity of the client 165 satisfies the volume filter, the detection engine 220 may be configured to apply the activity of the client 165 to the classification schemes 218, and classify the activity of the client 165 based on outputs from the trained classification schemes 218.

Once the detection engine 220 determines that the activity of the client 165 is activity of an autonomous program 208, the detection engine 220 may be configured to block subsequent requests from the client 165. For example, the detection engine 220 may be configured to ignore any subsequent requests received on the session 210 with the client 165. As another example, the detection engine 220 may be configured to generate a response for any subsequent requests indicating that the client 165 has been blocked. As yet another example, the detection engine 220 may be configured to terminate the session between the client 165 and the server 195 hosting the resource 206. On the other hand, where the detection engine 220 determines that the activity of the client 165 is activity of a user, the detection engine 220 may pass subsequent requests from the client 165 on the session 210 to the server 195, and transmit any responses from the server 195 back to the client 165. In this regard, the detection engine 220 may be configured to regulate requests from the clients 165 to the server 195 based on the respective classifications of the activity of the clients 165.

Figure 7:
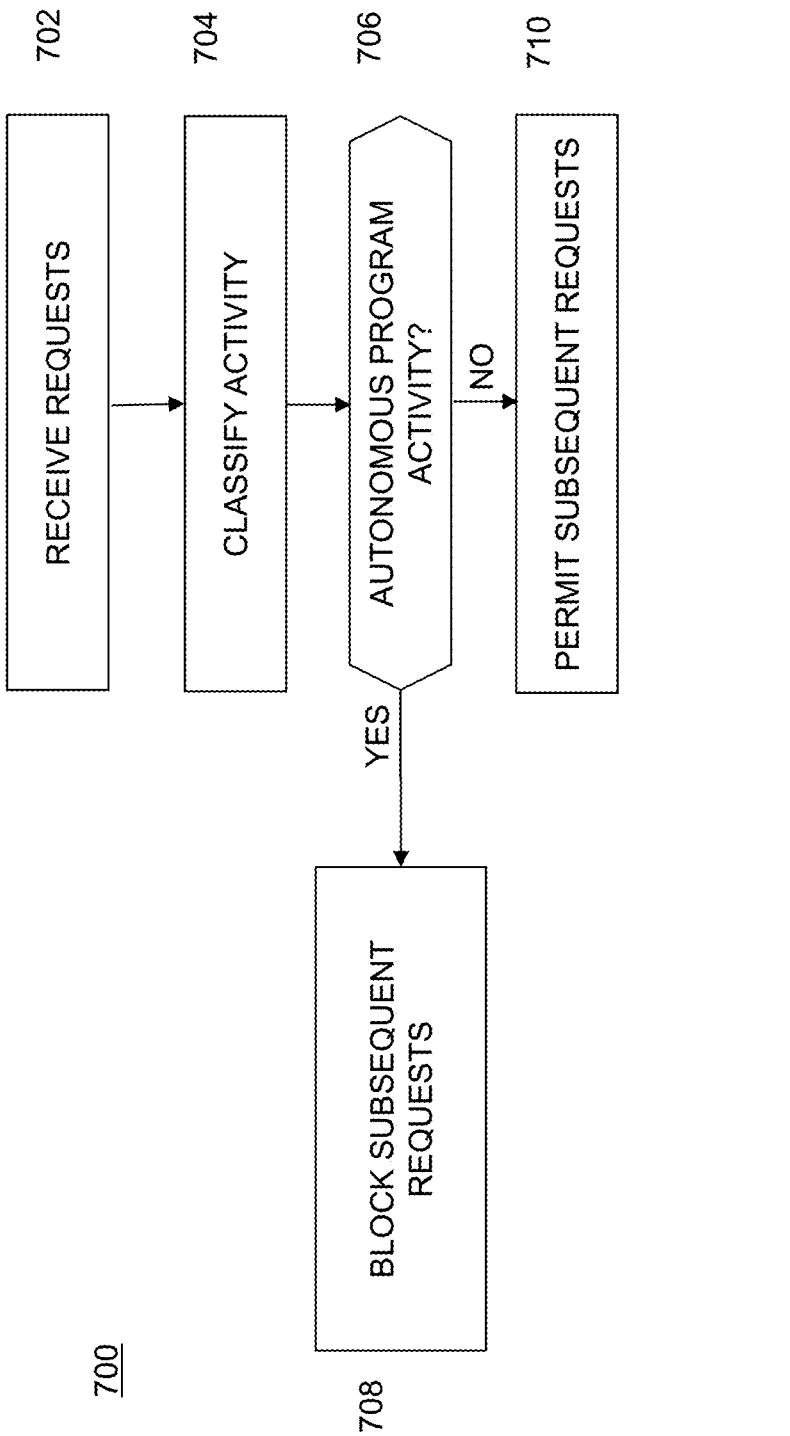
FIG. 7 is a flow diagram of a method for autonomous program detection, in accordance with an illustrative embodiment.

Referring now to FIG. 7, depicted is a flow diagram of one embodiment of a method 700 for autonomous program detection, according to an illustrative embodiment. Any of the operations described herein may be performed by one or more of the components or devices described above, for example, the device 202 or processor 105 (e.g., using instructions from memory 216). As a brief overview of the method 300, at step 702, the device may receive requests (e.g., from a client). At step 704, the device may classify the activity of the client. At step 706, the device may determine whether the activity of the client is classified as autonomous program activity. At step 708, where the device classifies the activity of the client as autonomous program activity, the device may block subsequent request(s) from the client. At step 710, where the device classifies the activity of the client as user activity, the device may permit subsequent request(s).

In some embodiments, prior to step 702, the device may develop schemes for classifying activity of the client as autonomous program activity. For example, the device may receive a dataset including a plurality of entries. Individual entries may include data for a plurality of requests. The requests may include requests originating from previous clients in previous sessions with a server hosting a service or resource. As such, individual entries of the dataset may be associated with a respective session between a client and a server, and individual entries may include data for a plurality of requests in the respective session. The device may use the entries of the dataset to develop a plurality of schemes.

In some embodiments, the device may determine a number of total requests for different entries of the dataset. The number of total requests may be or include a count of individual the requests from the respective entry. In some embodiments, the number of total requests may be a count of the requests which request content (i.e., content requests). The device may determine a count of the content types requested in the requests for each respective entry of the dataset. For example, the requests for the entry may include requests for specific types of content (i.e., requests for text content, requests for image content, requests for JAVASCRIPT content, requests for video content, requests for graphics or audio content, etc.). The device may determine a count of the types of content requested (i.e., a count which increases as new types of content are requested). For example, if the requests includes 10 requests for text content, 14 requests for image content, and 32 requests for JAVASCRIPT content, the count of the types of content requested may be three. The device may determine the counts by parsing the requests to extract, determine, or otherwise identify a type of content requested (e.g., by identifying a data format or other data from the body of the requests). The device may determine a frequency of the requests. In some embodiments, the frequency may be or include a number of requests within a time duration. The device may determine the frequency of requests by extracting a timestamp from the requests. The device may group the requests having a timestamp which is within a time duration of each other. As such, the frequency of request may include or correspond to a "burst" or group of requests which are sent within a time duration or window. The time duration may correspond to a request for rendering a webpage. In some embodiments, the device may compute an entropy of one or more values described above. For example, the device may compute an entropy of the count of the types of content requested and/or an entropy of the frequency of requests. The entropy may be or include a numerical value or range of values representing a probability of change over time. In other words, the entropy of the count of the types of content requested may be a numerical value or range of values representing a probability of the count of the types of content requested by the client changing over time. Similarly, the entropy of the frequency of requests may be a numerical value or range of values representing a probability of the frequency changing over time.

The device may apply or otherwise use the number of total requests, the count of content types, and the frequency of requests (or the entropy of content types and/or entropy of the frequency of the requests) to perform clustering techniques. The techniques may cluster or group entries from the dataset into clusters or groups. In some embodiments, the clustering techniques may group entries from the dataset into a first cluster representing activity of clients to be classified as activity of an autonomous program, and into a second cluster representing activity of clients to be classified as activity of users. In some embodiments, the device may apply or otherwise use the number of total requests to perform the clustering techniques to generate a first scheme (e.g., a classification scheme), the count of content types to the clustering techniques to generate a second scheme, and the frequency of requests to the clustering techniques to generate a third scheme. The schemes output by use of the clustering techniques may include clusters which are assigned to activity of clients classified as activity of a user, and clusters which are assigned to activity of clients classified as activities of an autonomous program. As described in greater detail below, the device may apply the models output by the clustering techniques to classify activity of the clients as activity of an autonomous program (or activity of a user).

At step 702, the device may receive requests (e.g., from a client). In some embodiments, the device may receive a plurality of requests to extract data from a webpage. The webpage may be or include a webpage of a resource maintained or hosted by a server. The device may receive the plurality of requests from the client. The client may generate the plurality of requests as the client navigates a series of webpages of the resource. The client may generate the plurality of requests on a session between the client and the server hosting the resource. As the client navigates to a new webpage of the resource, the client may generate a request including an address of the new webpage for the resource. The server may transmit a response to the client including, for instance, HTML of the webpage. The client may subsequently generate requests for content/data which is referenced in the HTML for rendering the webpage. Individual requests may be timestamp, and may reference or include data which indicates or identifies the content/data requested, and/or the address of the webpage.

The device may receive requests from a plurality of clients. In some embodiments, the device may group each of the requests for a respective client into groups. For example, individual requests may include a identifier which identifies a session between the respective client and the server hosting the resource (including the webpage). The device may group requests into sessions based on which requests include a shared (or common) session identifier. The device may use the grouped requests for classifying activity of a plurality of clients. As such, the activity of the clients is reflected in the group of requests sent by the client during the session.

At step 704, the device may classify the activity of the client. In some embodiments, the device may classify the activity of the client as activity of an autonomous program (i.e., activity of a client which is executing an autonomous program to generate requests for the server hosting the resource). In some embodiments, the device may classify the activity of the client as activity of a user (i.e., activity of a client which is operated by a user to navigate to webpages of the resource). The device may determine, identify, or otherwise extract one or more features from the requests generated by the client. The device may classify the activity of the client based on the feature(s) extracted from the requests.

In some embodiments, the device may apply the features extracted from the requests to one or more classification schemes for classifying the activity of the client. The device may maintain, include, or otherwise access the classification schemes. In some embodiments, the device may receive the classification schemes (i.e., from another device or component). In some embodiments, the device may develop the classification schemes as described above. The device may apply features extracted from the requests to the classification schemes to classify the activity of the client as activity of an autonomous program (or activity of a user).

In some embodiments, the device may determine a number of addresses from the requests in the session. The number of addresses may be or include a number of unique URL addresses in the session. The device may parse the requests from the client to determine which requests have a shared or common address (i.e., a shared or common URL). The device may determine a number of different content types accessed by the client in the session. Individual requests may include (i.e., in a body of the request) data which identifies the type of content requested (and an address or other identifier identifying the specific content). The device may parse the requests to extract or determine a type of content requested. The device may determine a number or count of requests for each different content type. As an example, the device may determine a number of requests for text content type, a number of requests for image content type, and so forth. The device may determine a content type entropy of the session. The content type entropy may be a numerical value which represents a probability of the types of content requested by the client changing over time. The device may compute the content type entropy based on the number or counts described above over time. The device may determine a number of requests which request informational content (i.e., text content, image content, JAVASCRIPT content, video or graphics content, audio content).

In some embodiments, the device may determine a total number of bursts within a session between the client and a server hosting the resource (including various pages). Individual bursts may be defined by the device as a number of requests from the client to the server within a respective time duration. The time duration may include a duration of time indicative of a series of requests for rendering a page of the resource. As such, the device may group requests of the session from the device based on the requests which are sent from the client to the server within the respective time duration. The device may determine a respective count of requests from different bursts (i.e., the number of requests from each group corresponding to a respective burst). The device may determine an entropy of the respective count of requests from individual bursts within the session. The entropy of the respective count may include a numerical value or range of values which indicate a probability of the respective count of requests changing over time.

In some embodiments, the device may apply a volume filter to the plurality of requests from the client. In some embodiments, the volume filter may be defined in relation to the number of addresses (i.e., unique or distinct addresses) from the requests. For example, as the client navigates from a first webpage to a second webpage of the resource, the client may generate a first set of requests specifying a first address of the first webpage and a second set of requests specifying a second address of the second webpage. The device may maintain a count of the addresses from the requests received from the client. The device may apply a volume filter to the count of the addresses. For example, if the count of addresses from the requests do not satisfy the volume filter, the device may not classify the activity of the client. On the other hand, if the count of addresses satisfies the volume filter (i.e., meets and/or exceeds the volume filter, the device may classify the activity of the client.

In some embodiments, the classification scheme(s) may include values or range(s) of values which represent clusters of activity. For instance, and as described above, the classification schemes may be developed (i.e., using requests) to generate a first cluster representing activity of clients which is autonomous program activity and a second cluster representing activity of clients which is user activity. The device may apply the features extracted from the requests to the classification schemes to assign a classification to the activity of the client.

At step 706, the device may determine whether the activity of the client is classified as autonomous program activity. In some embodiments, the device may determine whether the activity of the client is autonomous program activity based on outputs from applications of the classification scheme(s). In some embodiments, the classification schemes may generate a first output where the activity of the client satisfies a value or range of values of the classification scheme, and generate a second output where the activity of the client does not satisfy the value or range of values of the classification scheme (or satisfies a different value or range of values of the classification scheme). The device may classify the activity of the client as autonomous program activity based on outputs from the application of classification schemes. For instance, where the content type entropy of the activity of the client satisfies a content type entropy classification scheme (i.e., the content type entropy is less than a value or range included in the classification scheme), the device may classify the activity of the client as activity of an autonomous program. As another example, where the burst size entropy of the activity of the client satisfies a burst size entropy classification scheme (i.e., the burst size entropy is less than a value or range included in the classification scheme), the device may classify the activity of the client as activity of an autonomous program. As yet another example, where the number of content requests satisfies a number of content requests classification (i.e., the number of content requests exceeds a value or range included in the classification scheme), the device may classify activity of the client as autonomous program activity. In some instances, the classification schemes each generate the same output (i.e., each of the classification schemes generate the first output indicating that the activity of the client is activity of an autonomous program, or each of the classification schemes generate the second output indicating that the activity of the client is user activity). In such instances, the device may classify the activity of the client consistent with the output from the classification schemes.

In some instances, the classification schemes may output different values. For example, the number of content requests model and the burst size entropy model may each generate the first output, and the content type entropy model may generate the second output. Where there is a discrepancy in outputs, the device may apply one or more rules to the outputs for classifying the activity of the client. For example, the device may maintain, include, or otherwise access one or more rules for classifying activity of the client. The device may apply the one or more rules to the outputs from the classification scheme(s) to classify the activity of the clients. The rules may include a first rule which specifies classifying activity of the client as autonomous program activity where the number of content requests model and one of the burst size entropy model or the content type entropy model output the first value. The rules may include a second rule which specifies classifying activity of the client as autonomous program activity where each of the burst size entropy model and the content type entropy model output the first value. The rules may include a third rule which specifies classifying activity of the client as user activity where only one of the models generates the first value. Various other combinations/permutations of such rules may be used for classifying the activity of the client as autonomous program activity. The device may apply the one or more rules to the outputs from the classification schemes to classify the activity of the client.

At step 708, where the device classifies the activity of the client as autonomous program activity, the device may block or otherwise not respond subsequent request(s) from the client. In some embodiments, the device may block a subsequent request to extract data from the webpage responsive to the device classifying the activity of the client as activity of an autonomous program. The device may block or otherwise not process subsequent requests by responding to requests from the client (i.e., on the session) with an error message, by ignoring subsequent requests on the session, by terminating the session between the client and the server hosting the webpage, and so forth. On the other hand, at step 710, where the device classifies the activity of the client as user activity, the device may permit subsequent request(s). For example, the device may route subsequent requests from the client to the server hosting the resource including the webpage, and transmit subsequent responses from the server back to the client.

C. EXAMPLE EMBODIMENTS

The following examples pertain to further example embodiments, from which numer permutations and configurations will be apparent.

Example 1 includes a method including: receiving, by a device from a client, a plurality of requests to extract data from a resource; classifying, by the device, activity of the client as activity of an autonomous program based at least on a number of the plurality of requests, and one of i) one or more content types of the requests, or ii) a frequency in which the requests are received; and blocking, by the device, responsive to classification of the activity, a subsequent request from the client to extract data from the resource.

Example 2 includes the subject matter of Example 1, further comprising training a plurality of classification schemes for classifying the activity of the client as activity of an autonomous program, comprising: receiving a dataset comprising a plurality of entries, each entry of the plurality of entries including data for a plurality of requests; determining, for each entry of the dataset, a number of total requests for the entry, a count of content types requested in the requests, or a frequency of the requests; and applying the number of total requests, the count of content types, and the frequency of requests to a clustering algorithm to generate a classification scheme for a request count, a content type, or a frequency of requests.

Example 3 includes the subject matter of any of Examples 1 and 2, wherein a first cluster generated by the clustering algorithm is assigned to activity of clients classified as activity of a user, and a second cluster generated by the clustering algorithm is assigned to activity of clients classified as activity of an autonomous program.

Example 4 includes the subject matter of any of Examples 1 through 3, wherein the classification scheme for the content type, or the frequency of requests is an entropy classification scheme.

Example 5 includes the subject matter of any of Examples 1 through 4, wherein the device classifies the activity of the client as activity of an autonomous program responsive to one or more features extracted from the plurality of requests satisfying one or more classification schemes maintained by the device.

Example 6 includes the subject matter of any of Examples 1 through 5, further comprising applying, by the device, a volume filter to the plurality of requests.

Example 7 includes the subject matter of any of Examples 1 through 6, further comprising: grouping, by the device, the plurality of requests into a session of a respective client of a plurality of clients, wherein the activity of the plurality of clients is classified according to requests from sessions of the plurality of clients.

Example 8 includes the subject matter of any of Examples 1 through 7, further comprising extracting, by the device, one or more features from the plurality of requests, wherein the one or more features are used for classifying the activity of the client as activity of an autonomous program.

Example 9 includes the subject matter of any of Examples 1 through 8, wherein the one or more features comprise two or more of: a number of requests in a session between the client and a server; a number of unique uniform resource locators (URLs) in the session; a number of different content types accessed by the client in the session; a number of requests for each different content type of the number of different content types; a content type entropy of the session; or a number of requests which request informational content.

Example 10 includes the subject matter of any of Examples 1 through 9, wherein the count comprises a first count, and wherein the one or more features comprise: a total of bursts within a session between the client and a server, wherein each burst comprises a number of requests from the client to the server within a respective time duration; a respective second count of the number of requests from each burst of the total number of bursts; and an entropy of the respective second count from each burst within the session.

Example 11 includes a device comprising: one or more processors configured to: receive, from a client, a plurality of requests to extract data from a resource; classify activity of the client as activity of an autonomous program based at least on a number of the plurality of requests, and one of i) one or more content types of the requests, or ii) a frequency in which the requests are received; and block, responsive to classification of the activity, a subsequent request from the client to extract data from the resource.

Example 12 includes the subject matter of Example 11, wherein the one or more processors are further configured to train a plurality of classification schemes for classifying the activity of the client as activity of an autonomous program, comprising: receiving a dataset comprising a plurality of entries, each entry of the plurality of entries including data for a plurality of requests; determining, for each entry of the dataset, a number of total requests for the entry, a count of content types requested in the requests, or a frequency of the requests; and applying the number of total requests, the count of content types, and the frequency of requests to a clustering algorithm to generate a classification scheme for a request count, a content type, or a frequency of requests.

Example 13 includes the subject matter of any of Examples 11 and 12, wherein a first cluster generated by the clustering algorithm is assigned to activity of clients classified as activity of a user, and a second cluster generated by the clustering algorithm is assigned to activity of clients classified as activity of an autonomous program.

Example 14 includes the subject matter of any of Examples 11 and 12, wherein the classification scheme for the content type, or the frequency of requests is an entropy classification scheme.

Example 15 includes the subject matter of any of Examples 11 and 14 wherein the one or more processors are configured to classify the activity of the client as activity of an autonomous program responsive to one or more features extracted from the plurality of requests satisfying one or more classification schemes maintained by the device.

Example 16 includes the subject matter of any of Examples 11 and 15, wherein the one or more processors are further configured to group the plurality of requests into a session of a respective client of a plurality of clients, wherein the activity of the plurality of clients is classified according to requests from sessions of the plurality of clients.

Example 17 includes the subject matter of any of Examples 11 and 16, wherein the one or more processors are further configured to extract one or more features from the plurality of requests, wherein the one or more features are used for classifying the activity of the client as activity of an autonomous program.

Example 18 includes the subject matter of any of Examples 11 and 18, wherein the one or more features comprise two or more of: a number of requests in a session between the client and a server; a number of unique uniform resource locators (URLs) in the session; a number of different content types accessed by the client in the session; a number of requests for each different content type of the number of different content types; a content type entropy of the session; or a number of requests which request informational content.

Example 19 includes the subject matter of any of Examples 11 and 17, wherein the count comprises a first count, and wherein the one or more features comprise: a total of bursts within a session between the client and a server, wherein each burst comprises a number of requests from the client to the server within a respective time duration; a respective second count of the number of requests from each burst of the total number of bursts; and an entropy of the respective second count from each burst within the session.

Example 20 includes a non-transitory computer readable medium storing program instructions for causing a device including one or more processors to: receive, from a client, a plurality of requests to extract data from a resource; classify activity of the client as activity of an autonomous program based at least on a number of the plurality of requests, and one of i) one or more content types of the requests, or ii) a frequency in which the requests are received; and block, responsive to classification of the activity, a subsequent request from the client to extract data from the resource.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

We claim:

1. A method comprising:

receiving, by a device from a client, a plurality of requests to extract data from a resource;

generating a filtered plurality of requests by applying, by the device, a volume filter to the plurality of requests;

after applying the volume filter to the plurality of requests, classifying, by the device, activity of the client as activity of an autonomous program based at least on a number of the filtered plurality of requests, and one of i) one or more content types of the requests, or ii) a frequency in which the requests are received;

classifying, by the device, the activity of the client based on a count of content types identified in the filtered plurality of requests;

determining, by the device, whether the filtered plurality of requests was generated by the autonomous program in response to classification of the activity of the client; and when the filtered plurality of requests were generated by the autonomous program, blocking, by the device, a subsequent request from the client to extract data from the resource; and training a plurality of classification schemes for classifying the activity of the client as activity of the autonomous program, comprising:

receiving a dataset comprising a plurality of entries, each entry of the plurality of entries including data for a plurality of requests;

determining, for each entry of the dataset, a number of total requests for the entry, a count of content types requested in the requests, or a frequency of the requests; and applying the number of total requests, the count of content types, and the frequency of requests to a clustering algorithm to generate a classification scheme for a request count, a content type, or a frequency of requests.

2. The method of claim 1, wherein a first cluster generated by the clustering algorithm is assigned to activity of clients classified as activity of a user, and a second cluster generated by the clustering algorithm is assigned to activity of clients classified as activity of an autonomous program.

3. The method of claim 1, wherein the classification scheme for the content type, or the frequency of requests is an entropy classification scheme.

4. The method of claim 1, wherein the device classifies the activity of the client as activity of an autonomous program responsive to one or more features extracted from the plurality of requests satisfying one or more classification schemes maintained by the device.

5. The method of claim 1, further comprising:

extracting, by the device, one or more features from the plurality of requests, wherein the one or more features are used for classifying the activity of the client as activity of an autonomous program.

6. The method of claim 5, wherein the one or more features comprise two or more of:

a number of requests in a session between the client and a server;

a number of unique uniform resource locators (URLs) in the session;

a number of different content types accessed by the client in the session;

a number of requests for each different content type of the number of different content types;

a content type entropy of the session; or a number of requests which request informational content.

7. The method of claim 5, wherein the count comprises a first count, and wherein the one or more features comprise:

a total number of bursts within a session between the client and a server, wherein each burst comprises a number of requests from the client to the server within a respective time duration;

a respective second count of the number of requests from each burst of the total number of bursts; and an entropy of the respective second count from each burst within the session.

8. A device comprising:

one or more hardware processors configured to:

receive, from a client, a plurality of requests to extract data from a resource;

generate a filtered plurality of requests by applying, by the device, a volume filter to the plurality of requests;

classify, after applying the volume filter to the plurality of requests, activity of the client as activity of an autonomous program based at least on a number of the filtered plurality of requests, and one of i) one or more content types of the requests, or ii) a frequency in which the requests are received;

classify the activity of the client based on a count of content types identified in the filtered plurality of requests;

determine, by the device, whether the filtered plurality of requests was generated by the autonomous program in response to classification of the activity of the client;

when the filtered plurality of requests were generated by the autonomous program, block a subsequent request from the client to extract data from the resource; and wherein the one or more hardware processors are further configured to train a plurality of classification schemes for classifying the activity of the client as activity of an autonomous program, comprising:

receiving a dataset comprising a plurality of entries, each entry of the plurality of entries including data for a plurality of requests;

determining, for each entry of the dataset, a number of total requests for the entry, a count of content types requested in the requests, or a frequency of the requests; and applying the number of total requests, the count of content types, and the frequency of requests to a clustering algorithm to generate a classification scheme for a request count, a content type, or a frequency of requests.

9. The device of claim 8, wherein a first cluster generated by the clustering algorithm is assigned to activity of clients classified as activity of a user, and a second cluster generated by the clustering algorithm is assigned to activity of clients classified as activity of an autonomous program.

10. The device of claim 8, wherein the classification scheme for the content type, or the frequency of requests is an entropy classification scheme.

11. The device of claim 8, wherein the one or more hardware processors are further configured to:

classify the activity of the client as activity of an autonomous program responsive to one or more features extracted from the plurality of requests satisfying one or more classification schemes maintained by the device.

12. The device of claim 8, wherein the one or more hardware processors are further configured to:

extract one or more features from the plurality of requests, wherein the one or more features are used for classifying the activity of the client as activity of an autonomous program.

13. The device of claim 12, wherein the one or more features comprise two or more of:

a number of requests in a session between the client and a server;

a number of unique uniform resource locators (URLs) in the session;

a number of different content types accessed by the client in the session;

a number of requests for each different content type of the number of different content types;

a content type entropy of the session; or a number of requests which request informational content.

14. The device of claim 12, wherein the count comprises a first count, and wherein the one or more features comprise:

a total number of bursts within a session between the client and a server, wherein each burst comprises a number of requests from the client to the server within a respective time duration;

a respective second count of the number of requests from each burst of the total number of bursts; and an entropy of the respective second count from each burst within the session.

15. A non-transitory computer readable medium storing program instructions that, when executed, cause:

receiving, from a client, a plurality of requests to extract data from a resource;

generating a filtered plurality of requests by applying a volume filter to the plurality of requests;

after applying the volume filter to the plurality of requests, classifying activity of the client as activity of an autonomous program based at least on a number of the filtered plurality of requests, and one of i) one or more content types of the requests, or ii) a frequency in which the requests are received;

determining whether the filtered plurality of requests was generated by the autonomous program in response to classification of the activity of the client;

when the filtered plurality of requests were generated by the autonomous program, blocking a subsequent request from the client to extract data from the resource; and training a plurality of classification schemes for classifying the activity of the client as activity of the autonomous program, comprising:

receiving a dataset comprising a plurality of entries, each entry of the plurality of entries including data for a plurality of requests;

determining, for each entry of the dataset, a number of total requests for the entry, a count of content types requested in the requests, or a frequency of the requests; and applying the number of total requests, the count of content types, and the frequency of requests to a clustering algorithm to generate a classification scheme for a request count, a content type, or a frequency of requests.

16. The method of claim 1, wherein the classifying, by the device, activity of the client as activity of the autonomous program based at least on a number of the filtered plurality of requests is based on one or more content types of the requests and a frequency in which the requests were received.

17. The device of claim 8, wherein the one or more hardware processers are configured to classify activity of the client as activity of the autonomous program based at least on a number of the filtered plurality of requests is based on one or more content types of the requests and a frequency in which the requests were received.

18. The non-transitory computer readable medium of claim 15, wherein the classifying activity of the client as activity of the autonomous program based at least on a number of the filtered plurality of requests is based on one or more content types of the requests and a frequency in which the requests were received.

\* \* \* \* \*